United States Patent
Kurokawa et al.

(10) Patent No.: US 8,835,534 B2
(45) Date of Patent: Sep. 16, 2014

(54) AROMATIC POLYCARBONATE RESIN COMPOSITION, METHOD FOR PRODUCING THE RESIN COMPOSITION, AND MOLDED ARTICLE OF THE SAME

(75) Inventors: Haruhiko Kurokawa, Hiratsuka (JP); Yasushi Ogawa, Hiratsuka (JP); Yutaka Shiraishi, Hiratsuka (JP)

(73) Assignee: Mitsubishi Engineering-Plastics Corporation, Tokyo (JP)

( * ) Notice: Subject to any disclaimer, the term of this patent is extended or adjusted under 35 U.S.C. 154(b) by 582 days.

(21) Appl. No.: 13/144,659

(22) PCT Filed: Feb. 23, 2010

(86) PCT No.: PCT/JP2010/052701
§ 371 (c)(1),
(2), (4) Date: Jul. 14, 2011

(87) PCT Pub. No.: WO2010/101043
PCT Pub. Date: Sep. 10, 2010

(65) Prior Publication Data
US 2011/0269882 A1 Nov. 3, 2011

(30) Foreign Application Priority Data

Mar. 4, 2009 (JP) ................................. 2009-050305
May 19, 2009 (JP) ................................. 2009-121051
Aug. 6, 2009 (JP) ................................. 2009-183197
Feb. 18, 2010 (JP) ................................. 2010-033146

(51) Int. Cl.
*C08K 9/04* (2006.01)
*C08K 9/02* (2006.01)
*C08L 69/00* (2006.01)
*G02B 1/04* (2006.01)
*C08L 27/18* (2006.01)
*C08K 5/42* (2006.01)
*C08K 9/06* (2006.01)

(52) U.S. Cl.
CPC . *G02B 1/04* (2013.01); *C08L 69/00* (2013.01); *C08K 2201/005* (2013.01); *C08K 9/02* (2013.01); *C08L 27/18* (2013.01); *C08K 5/42* (2013.01); *C08K 9/06* (2013.01)
USPC ............................. 523/200; 524/161; 524/611

(58) Field of Classification Search
USPC .................... 523/200; 524/161, 611; 428/220
See application file for complete search history.

(56) References Cited

U.S. PATENT DOCUMENTS 5,723,526 A 3/1998 Nagasawa

FOREIGN PATENT DOCUMENTS

| JP | 08 059976 | 3/1996 |
|---|---|---|
| JP | 10 279814 | 10/1998 |
| JP | 11 181267 | 7/1999 |
| JP | 2000 239509 | 9/2000 |
| JP | 3124488 | 10/2000 |
| JP | 2003 183491 | 7/2003 |
| JP | 2005 240012 | 9/2005 |
| JP | 2006-89599 A | 4/2006 |
| JP | 2006 117860 | 5/2006 |
| JP | 2006 241262 | 9/2006 |
| JP | 2007 509208 | 4/2007 |
| JP | 2007 119554 | 5/2007 |
| JP | 2008 195818 | 8/2008 |

OTHER PUBLICATIONS

International Search Report issued May 18, 2010 in PCT/JP10/052701 filed Feb. 23, 2010.

*Primary Examiner* — Hannah Pak
(74) *Attorney, Agent, or Firm* — Oblon, Spivak, McClelland, Maier & Neustadt, L.L.P.

(57) ABSTRACT

An aromatic polycarbonate resin composition superior in thermal stability, flame retardancy, and light reflectivity, and a light reflective member consisting of a molded article of the resin.

An aromatic polycarbonate resin composition comprising, 3 to 30 parts by weight of a titanium oxide-based additive (B) which has been surface-treated with alumina and organosiloxane, 0.01 to 1 parts by weight of a metal salt of aromatic sulfonic acid (C), and 0.05 to 0.9 parts by weight of polytetrafluoroethylene (D) based on 100 parts by weight of an aromatic polycarbonate resin (A), characterized in that an aluminum content a (wt %), a carbon content c (wt %) in the titanium oxide-based additive (B), and an average particle size d (μm) of titanium oxide satisfy the following (1) and (2):

$$6.5 \leq (a/d^2) \leq 15 \qquad (1)$$

$$5 \leq (c/d^2) \leq 25 \qquad (2).$$

7 Claims, No Drawings

AROMATIC POLYCARBONATE RESIN COMPOSITION, METHOD FOR PRODUCING THE RESIN COMPOSITION, AND MOLDED ARTICLE OF THE SAME

TECHNICAL FIELD

The present invention relates to an aromatic polycarbonate resin composition, a method for producing the resin composition, and a molded article, and relates to an aromatic polycarbonate resin composition superior in thermal stability and flame retardancy, comprising a combination of titanium oxide having a specified composition and a metal salt of aromatic sulfonic acid. In more detail, the present invention relates to an aromatic polycarbonate resin composition which has superior optical characteristics such as light beam reflectance, light-blocking effect, light resistance, hue, and further superior thermal stability, flame retardancy, and appearance, while maintains mechanical properties inherent to polycarbonate resin, and a molded article of the resin.

BACKGROUND ART

Since polycarbonate resin is superior in transparency, mechanical properties, electric properties, heat resistance, dimensional stability, and the like as a general-purpose engineering plastic, it has been used in wide ranged fields such as parts of electric/electronic equipment components, office automation equipments, machine components, car parts, construction members, various kinds of containers, leisure goods and groceries.

Among these application fields, in information display devices for computers, televisions, and the like, including thin film transistors (TFT), a display device incorporated with reflection plate in which a high degree of light beam reflectance is required, such as reflection plate for backlight of liquid crystal display devices and reflection plate for illuminated type pushbutton switches and photoelectric switches is becoming popularly used.

For these light reflective members in which a high degree of light beam reflectance is required, molded resin articles or the like obtained by molding a polycarbonate resin composition having a high content of particulate such as titanium oxide from the viewpoints of light reflectivity, formability and impact strength have been used.

For the light reflection members consisting of polycarbonate resin composition, flame retardation has been strongly required, and in order to respond this request, a number of technologies in which flame retardation is achieved by blending halogen-based compound, phosphorus-based compound, siloxane-based compound, polytetrafluoroethylene, and the like into an aromatic polycarbonate resin have been proposed. Recently, out of consideration for environment, instead of using bromine-based flame retardant or phosphorus-based flame retardant, a flame retardant resin composition using other type of flame retardant is demanded.

As a flame retardant polycarbonate in which an organometallic salt is blended, for example, Patent Literature 1 describes a resin composition comprising polycarbonate resin, sodium salt of aromatic sulfonic acid and polytetrafluoroethylene. However, the resin composition of Patent Literature 1 is inferior in reflecting property and flame retardancy in thin-walled product due to no addition of titanium oxide, therefore the resin composition cannot be said to have sufficient performance as a flame retardant light reflective material.

Also, Patent Literature 2 describes a resin composition in which a metal salt of aromatic sulfonic acid showing pH 6.4 to 7.5 (specifically, sodium salt of branched dodecylbenzenesulfonic acid) (B) and polytetrafluoroethylene are blended in polycarbonate resin (A). However, the resin composition of Patent Literature 2 is also insufficient for thin-walled products use, because combustibility for a thickness less than 1.5 mm does not satisfy the level of V-0, due to no addition of titanium oxide.

In addition, as an example of flame retardant polycarbonate in which non-phosphorus-based flame retardant and titanium oxide are used in combination, for example, Patent Literature 3 describes a resin composition comprising a polycarbonate resin, a silicone-based flame retardant in which polyorganosiloxane polymer is supported on silica, and polytetrafluoroethylene, which exhibits UL flame retardancy of V-0 for 1.5 mm. However, the resin composition of Patent Literature 3 tends to have poor appearance such as flow mark occurring during molding by inorganic silica in the flame retardant, and silver streak by elimination of low viscosity polydimethylsiloxane, therefore cannot be said to have sufficient performance as a member in which designing property is particularly demanded.

On the other hand, examples of flame retardant polycarbonate resin composition in which an organometallic salt and titanium oxide are used in combination include Patent Literatures 4 to 6.

Patent Literature 4 describes a resin composition in which titanium oxide (B) and 1 to 8 parts by weight (parts by mass) of alkylbenzenesulfonate type antistatic agent (C) are added to polycarbonate resin (A). However, in the resin composition of this Patent Literature 4, molecular weight of polycarbonate tends to decrease significantly during molding due to too large amount of alkali metal salt to be added, and formability and flame retardancy tend to be deteriorated.

Also, Patent Literature 5 describes a resin composition in which polytetrafluoroethylene (B), organometallic salt (E), silicone compound (D), and further specified titanium oxide are added to polycarbonate resin (A). However, in the resin composition of Patent Literature 4, since poor appearance such as silver streak greatly depends on rather secondary aggregation state of titanium oxide, a satisfactory result can be hardly obtained with the titanium oxide described in the claims of the Literature. In addition, poor appearance tends to occur by addition of a silicone compound.

Further, Patent Literature 6 describes a flame retardant resin composition in which polytetrafluoroethylene, organometallic salt, silicone compound and titanium oxide are added to polycarbonate resin. However, these compositions are inferior in high temperature stability and residence stability, and impact resistance and appearance tend to deteriorate remarkably.

As for surface treatment with titanium oxide, for example, Patent Literature 7 describes that needle-like titanium oxide treated with polyorganosiloxane is used in polycarbonate resin. However, only by surface-treating titanium oxide with polyorganosiloxane, poor appearance such as silver streak tends to easily occur.

PRIOR ART LITERATURES

Patent Literatures

Patent Literature 1: JP-A-2000-239509
Patent Literature 2: JP-A-2007-119554
Patent Literature 3: JP-B-3124488
Patent Literature 4: JP-A-11-181267

Patent Literature 5: JP-A-2006-241262
Patent Literature 6: JP-A-2003-183491
Patent Literature 7: JP-A-8-59976

SUMMARY OF INVENTION

Problem to be Solved by the Invention

An object of the present invention is to provide a polycarbonate resin composition which maintains characteristics inherent to polycarbonate resin and can provide a product superior in light beam reflectance, flame retardancy, impact resistance and thermal stability, having superior appearance, and a molded resin article, specifically a light reflective member, obtained by molding the same.

Means for Solving the Problem

The present inventors have intensively studied on aromatic polycarbonate resin composition to solve the above-described problems. And the inventors have intensively studied the condition on titanium oxide surface of alumina and polyorganosiloxane, and have found that an aromatic polycarbonate resin composition and a light reflective member which is superior in light beam reflectance, flame retardancy, impact resistance and thermal stability, and has superior appearance and a high reflectance can be obtained by controlling amounts of alumina and carbon on titanium oxide in a specified range in relation to particle size of titanium oxide, and further by combining a metal salt of aromatic sulfonic acid and polytetrafluoroethylene, and finally accomplished the present invention.

That is, according to the first aspect of the present invention, there is provided an aromatic polycarbonate composition comprising 3 to 30 parts by weight of a titanium oxide-based additive (B) which has been surface-treated with alumina and organosiloxane, 0.01 to 1 parts by weight of a metal salt of aromatic sulfonic acid (C), and 0.05 to 0.9 parts by weight of polytetrafluoroethylene (D) based on 100 parts by weight of an aromatic polycarbonate resin (A), characterized in that an aluminium content a (wt %) in the titanium oxide-based additive (B) obtained by fluorescent X-ray analysis, a carbon content c (wt %) in the titanium oxide-based additive (B) obtained by using a high-frequency combustion type carbon analyzer, and an average particle size d (μm) of titanium oxide satisfy the following (1) and (2):

$$6.5 \leq (a/d^2) \leq 15 \quad (1)$$

$$5 \leq (c/d^2) \leq 25 \quad (2)$$

According to the second aspect of the present invention, there is provided the aromatic polycarbonate resin composition according to the first aspect, characterized in that a carbon content c in the titanium oxide-based additive (B) is 0.2 to 2 wt %.

According to the third aspect of the present invention, there is provided the aromatic polycarbonate resin composition according to the first or the second aspect, characterized in that a content [B] (wt %) of the titanium oxide-based additive (B) based on the total amount of 100 wt % of the aromatic polycarbonate resin composition and said carbon content c (wt %) satisfy the following (3):

$$1 \leq c \times [B] \leq 9 \quad (3)$$

According to the fourth aspect of the present invention, there is provided the aromatic polycarbonate resin composition according to the first aspect, characterized in that the organosiloxane is a polyorganosiloxane having a Si—H group.

According to the fifth aspect of the present invention, there is provided the aromatic polycarbonate resin composition according to the first aspect, characterized in that an aromatic ring of the metal salt of aromatic sulfonic acid (C) has no substituent or has only an alkyl group having 1 to 4 carbon atoms as a substituent, and the pH of the metal salt of aromatic sulfonic acid (C) in an aqueous solution is 6.0 to 8.5.

According to the sixth aspect of the present invention, there is provided the aromatic polycarbonate resin composition according to the first or the fifth aspect, characterized in that the metal salt of aromatic sulfonic acid (C) is sodium para-toluenesulfonate or potassium para-toluenesulfonate.

According to the seventh aspect of the present invention, there is provided the aromatic polycarbonate resin composition according to the first aspect, characterized in that a polytetrafluoroethylene having a crystal structure of 13/6 helical structure is used when polytetrafluoroethylene (D) is added to aromatic polycarbonate resin (A).

According to the eighth aspect of the present invention, there is provided a method for producing the polycarbonate resin composition according to the first aspect, comprising a step to obtain a polycarbonate resin composition by mixing a masterbatch wherein a polytetrafluoroethylene having a crystal structure of 13/6 helical structure has been blended to a granular form of polycarbonate resin which has a specific surface area of 0.01 to 5 mm$^2$/g and in which 60 to 95 wt % thereof have a particle size of 180 to 1700 μm.

According to the ninth aspect of the present invention, there is provided the method for producing the polycarbonate resin composition according to the eighth aspect, wherein the crystal structure of the polytetrafluoroethylene is converted to a 13/6 helical structure by adjusting temperature.

According to the tenth aspect of the present invention, there is provided the method for producing the polycarbonate resin composition according to the eighth or the ninth aspect, wherein the polytetrafluoroethylene is maintained at a temperature of 19° C. or lower.

According to the eleventh aspect of the present invention, there is provided the method for producing the polycarbonate resin composition according to any one of the eighth to the tenth aspects, wherein when the polycarbonate resin composition which is obtained by mixing a masterbatch in which a polytetrafluoroethylene having a crystal structure of 13/6 helical structure has been blended to a granular form of polycarbonate resin which has a specific surface area of 0.01 to 5 mm$^2$/g and in which 60 to 95 wt % thereof have a particle size of 180 to 1700 μm, is molded, molding is carried out after converting the crystal structure of polytetrafluoroethylene to a 15/7 helical structure.

According to the twelfth aspect of the present invention, there is provided the method for producing the polycarbonate resin composition according to the eleventh aspect, wherein the polytetrafluoroethylene having a crystal structure of 13/6 helical structure is blended to said granular form of polycarbonate resin maintained at a temperature of 19° C. or lower.

According to the thirteenth aspect of the present invention, there is provided the method for producing the polycarbonate resin composition according to the eighth aspect, wherein the masterbatch is mixed with polycarbonate resin after being maintained at a temperature of 19° C. or lower.

According to the fourteenth aspect of the present invention, there is provided a method for producing the polycarbonate resin composition according to the first aspect, characterized by comprising a step to mix a masterbatch in which a metal salt of aromatic sulfonic acid has been blended to a granular form of polycarbonate resin which has a specific surface area of 0.01 to 5 mm$^2$/g and in which 60 to 95 wt % thereof have a particle size of 180 to 1700 μm.

According to the fifteenth aspect of the present invention, there is provided a method for producing the polycarbonate resin composition according to the first aspect, characterized by comprising a step to mix a masterbatch in which a titanium oxide-based additive has been blended to a granular form of polycarbonate resin which has a specific surface area of 0.01 to 5 mm$^2$/g and in which 60 to 95 wt % thereof have a particle size of 180 to 1700 μm.

According to the sixteenth aspect of the present invention, there is provided a molded article obtained from the aromatic polycarbonate resin composition according to any one of the first to the seventh aspects.

According to the seventeenth aspect of the present invention, there is provided the molded article according to the sixteenth aspect, wherein the molded article is a light reflective member.

Effect of the Invention

The aromatic polycarbonate resin composition of the present invention is superior in light resistance, light-blocking effect, light beam reflective property, hue, flame retardancy, and molding stability, having no occurrence of surface defects such as silver streak, and superior appearance, and has at the same time impact resistance, heat resistance, dimensional stability, appearance traits, and the like which are inherently possessed by the aromatic polycarbonate resin.

Accordingly, the aromatic polycarbonate resin composition of the present invention can be used widely as light reflective members such as light beam reflection plate for backlight of liquid crystal display devices, light reflection frame or light reflection sheet, illumination devices for electric/electronic equipment, advertising light and the like, and automobile devices such as instrument panel for automobile.

EMBODIMENTS FOR CARRYING OUT THE INVENTION

Hereinafter, embodiments for carrying out the present invention will be explained in detail.
[1. General Description]
The aromatic polycarbonate resin composition of the present invention comprises an aromatic polycarbonate resin (A), a titanium oxide-based additive (B) which has been surface-treated with alumina and organosiloxane, a metal salt of aromatic sulfonic acid (C), and a polytetrafluoroethylene (D), in specified amounts, respectively, and further is characterized in that amounts of aluminium and carbon in component (B) satisfy a specified relationship with particle size of titanium oxide.

Hereinafter, each component to be used in the aromatic polycarbonate resin composition of the present invention will be explained in detail.
[2. Aromatic Polycarbonate Resin (A)]
The aromatic polycarbonate resin composition (A) to be used in the present invention is an optionally branched thermoplastic polymer or copolymer which is obtained by reacting an aromatic dihydroxy compound optionally together with a small amount of polyhydroxy compound with phosgene or a diester carbonate. Method for producing the aromatic polycarbonate resin is not particularly limited, and those produced by heretofore known phosgene method (interfacial polymerization method) or fusion method (ester exchange method) can be used. In addition, when fusion method is used, a polycarbonate resin having an adjusted amount of OH group in the terminal group can be used.

Aromatic dihydroxy compound as a raw material includes 2,2-bis(4-hydroxyphenyl)propane (=bisphenol A), tetramethylbisphenol A, bis(4-hydroxyphenyl)-p-diisopropylbenzene, hydroquinone, resorcinol, 4,4-dihydroxydiphenyl, and the like, and preferably bisphenol A. In addition, a compound in which the above-described aromatic dihydroxy compound is linked with one or more tetraalkylphosphonium sulfonate can be used.

These aromatic dihydroxy compounds may be used alone or in combination of two or more kinds in mixed state.

The branched aromatic polycarbonate resin may be obtained by substituting a part of the above-described aromatic dihydroxy compound by the following a branching agents, for example, a polyhydroxy compound such as phloroglucin, 4,6-dimethyl-2,4,6-tri(4-hydroxyphenyl)heptene-2,4,6-dimethyl-2,4,6-tri(4-hydroxyphenyl)heptane, 2,6-dimethyl-2,4,6-tri(4-hydroxyphenylheptene-3,1,3,5-tri(4-hydroxyphenyl)ethane, or a compound such as 3,3-bis-(4-hydroxyaryl)oxindole (=isatin-bis-phenol), 5-chloroisatin, 5,7-dichloroisatin, 5-bromoisatin. These branching agents may be used alone, or two or more kinds of these agents may be used in combination.

Usage of these branching agents to be used is 0.01 to 10 mole %, and preferably 0.1 to 2 mole % based on aromatic dihydroxy compound.

As aromatic polycarbonate resin (A), among the above-described compounds, a polycarbonate resin derived from 2,2-bis-(4-hydroxyphenyl)propane or a polycarbonate copolymer derived from 2,2-bis-(4-hydroxyphenyl)propane and other aromatic dihydroxy compound is preferable. And also, aromatic polycarbonate resin (A) may be a copolymer mainly composed of a polycarbonate resin such as copolymer with a polymer or an oligomer having a siloxane structure. Further, two or more kinds of the above-described aromatic polycarbonate resins may be used in combination.

Adjustment of molecular weight of the aromatic polycarbonate resin may be performed by using a monovalent aromatic hydroxyl compound. Monovalent aromatic hydroxyl compound for molecular weight adjustment includes, for example, m- and p-methylphenol, m- and p-propylphenol, p-tert-butylphenol, p-long-chain alkyl-substituted phenol, and the like. These compounds may be used alone or two or more kinds of these compounds may be used in combination.

Molecular weight of aromatic polycarbonate resin (A) to be used in the present invention is optional and may be decided by appropriately selecting, but from the viewpoint of formability, strength, and the like, viscosity average molecular weight [Mv] of the resin is preferably 10,000 to 40,000, and further more preferably 10,000 to 30,000, wherein the viscosity average molecular weight [Mv] is obtained by converting from a solution viscosity measured at 25° C. using methylene chloride as a solvent. By adjusting the viscosity average molecular weight to 10,000 or more as described above, mechanical strength tends to be increased, and such resin is more preferable when the resin is intended for a use where a high mechanical strength is required. On the other hand, by adjusting the viscosity average molecular weight to 40,000 or less, lowering of fluidity tends to be more inhibited and improved, and such resin is preferable from the viewpoint of easy forming processability.

Above all, the viscosity average molecular weight is preferably 10,000 to 22,000, further more preferably 12,000 to 22,000, and particularly preferably 14,000 to 20,000. In addition, two or more kinds of aromatic polycarbonate resins having different viscosity average molecular weights may be used in combination, and in such case, an aromatic polycarbonate resin having a viscosity average molecular weight out of the above-described preferable range may be mixed. In this case, viscosity average molecular weight of the mixture is desirably in the above-described range.

[3. Titanium Oxide-Based Additive (B)]

Titanium oxide-based additive (B) in the present invention is the one which has been surface-treated with an alumina-based and an organosiloxane-based surface treatment agent so that the surface of titanium oxide is coated with alumina and organosiloxane in a specified state as described in detail below. By this treatment, additive (B) becomes extremely superior in dispersibility, and functions so as to improve light-blocking effect, whiteness, light beam reflective property, and the like of molded articles obtained from the polycarbonate resin composition of the present invention.

As for titanium oxide to be used for titanium oxide-based additive (B), production method, crystalline form and average particle size, and the like thereof are not particularly limited. Production method of titanium oxide includes (1) sulfuric acid method and (2) chlorine method, but since a composition containing titanium oxide produced by sulfuric acid method tends to be inferior in whiteness, the one produced by chlorine method is suitable to achieve effectively the object of the present invention.

Crystalline form of titanium oxide includes rutile type and anatase type, but titanium oxide having rutile type crystalline form is suitable from the viewpoint of light resistance. Average particle size of the titanium oxide-based additive is generally 0.1 to 0.7 µm, and preferably 0.1 to 0.4 p.m. Average particle size less than 0.1 µm gives molded articles having inferior light beam blocking property, and when average particle size exceeds 0.7 µm, molded articles tend to have chalk mark on the surface of molded articles or decrease in mechanical strength of molded articles. It should be noted that two or more types of titanium oxide different in average particle size may be used in combination in the present invention.

Titanium oxide-based additive (B) is preferably subjected to a pretreatment with alumina-based surface treatment agent before the surface treatment with an organosiloxane-based surface treatment agent as described later. As the alumina-based surface treatment agent, alumina hydrate, aluminate salt, and the like are suitably used. Further, additive (B) may be subjected to a pretreatment with silicic acid hydrate together with alumina hydrate and the like. As the silicic acid-based surface treatment agent, silicic acid hydrate is suitably used.

Pretreatment method is not particularly limited, and may be carried out by any method. Pretreatment with alumina hydrate, if necessary, together with silicic acid hydrate is carried out preferably in a range of 1 to 15 wt % based on titanium oxide. It should be noted that, when alumina-based surface treatment agent and silicic acid-based surface treatment agent are used in combination, ratio of silicic acid-based surface treatment agent to be used is preferably around 35 to 90 wt % based on the sum of alumina-based surface treatment agent and silicic acid-based surface treatment agent.

Titanium oxide pretreated with alumina hydrate, if necessary, together with silicic acid hydrate is further subjected to a surface treatment with an organosiloxane-based surface treatment agent. By this surface treatment, titanium oxide can be drastically improved in thermal stability, and also improved in homogeneous dispersibility in the polycarbonate resin composition and stability of the dispersed state. As the organosiloxane-based surface treatment agent, polyorganohydrogensiloxane compound is preferable.

As for organosiloxane surface treatment agent, among them, an organic silicon compound which contains a reactive functional group having a reactive functional group to react with the surface of inorganic compound particles is preferable. Reactive functional group includes Si—H group, Si—OH group, Si—NH group, and Si—OR group, and the organic silicon compound having Si—H group, Si—OH group, and Si—OR group is more preferable, and Si—H group containing organic silicon compound having a Si—H group is particularly preferable.

Si—H group containing organic silicon compound is not particularly limited, so long as the compound has a Si—H group in a molecule, and may be properly selected and used. Among them, polyorganohydrogensiloxane such as poly(methylhydrogensiloxane), polycyclo(methylhydrogensiloxane), poly(ethylhydrogensiloxane), poly(phenylhydrogensilixane), poly[(methylhydrogensiloxane)(dimethylsiloxane)]copolymer, poly[(methylhydrogensiloxane)(ethylmethylsiloxane)]copolymer, poly[(methylhydrogensiloxane)(diethylsiloxane)]copolymer, poly[(methylhydrogensiloxane)(hexylmethylsiloxane)]copolymer, poly[(methylhydrogensiloxane)(octylmethylsiloxane)]copolymer, poly[(methylhydrogensiloxane)(phenylmethylsiloxane)]copolymer, poly[(methylhydrogensiloxane)(diethoxysiloxane)]copolymer, poly[(methylhydrogensiloxane)(dimethoxysiloxane)]copolymer, poly[(methylhydrogensiloxane)(3,3,3-trifluoropropylmethylsiloxane)]copolymer, poly[(dihydrogensiloxane)((2-methoxyethoxy)methylsiloxane)]copolymer, poly [(dihydrogensiloxane)(phenoxy methylsiloxane)]copolymer is preferable.

Surface treatment method of titanium oxide with an organosiloxane-based surface treatment agent includes (1) wet method and (2) dry method. Wet method is the one in which titanium oxide pretreated with alumina hydrate, if necessary, together with silicic acid hydrate is added to a mixture of an organosiloxane-based surface treatment agent and a solvent, and after stirring the solvent is removed, and then the mixture is further subjected to a heat treatment at 100 to 300° C.

Dry method includes a method in which titanium oxide pretreated in the same way as described above and polyorganohydrogensiloxanes are mixed in a Henschel mixer or the like, and a method in which pretreated titanium oxide is sprayed with a solution of polyorganohydrogensiloxanes in a organic solvent, and then subjected to a heat treatment at 100 to 300° C., and the like.

Amount of the siloxane-based surface treatment agent is not particularly limited, but usually in a range of 1 to 5 wt % based on titanium oxide in consideration of reflectivity of titanium oxide, formability of the resin composition, and the like.

Above all, titanium oxide-based additive (B) to be used in the present invention is characterized by exhibiting superior thermal stability in the polycarbonate composition in the presence of metal salt of aromatic sulfonic acid. Specifically, titanium oxide-based additive (B) is characterized by satisfying the following two expressions.

An aluminium content a (wt %) in the titanium oxide-based additive (B) obtained by fluorescent X-ray analysis of titanium oxide-based additive (B), a carbon content c (wt %) in the titanium oxide-based additive (B) obtained by using a high-frequency combustion type carbon analyzer, and average particle size d (µm) of titanium oxide satisfy the following (1) and (2).

$$6.5 \leq (a/d^2) \leq 15 \quad (1)$$

$$5 \leq (c/d^2) \leq 25 \quad (2)$$

When these (1) and (2) are satisfied, the additive exerts superior effects in thermal stability, flame retardancy, and light reflection property.

In order to obtain further superior thermal stability, the value of $(a/d^2)$ in (1) is preferably 8 or more, more preferably 9 or more, further more preferably 10 or more, and particularly preferably 11 or more, and the upper limit thereof is preferably 14 or less, more preferably 13 or less, and further more preferably 12 or less. In addition, the value of $(c/d^2)$ in (2) is preferably less than 20, further more preferably less than 15, and particularly preferably less than 13, and the lower limit thereof is preferably 6 or more, more preferably 10 or more, and particularly preferably 11 or more.

In particular, a range of the value of $(a/d^2)$ in (1) is preferably 10 to 14, among them, 11 to 13, and a range of the value of $(c/d^2)$ in (2) is preferably 10 to 15, above all, 11 to 14.

Average particle size of titanium oxide correlates to surface area thereof, and as average particle size becomes smaller, surface area per unit mass becomes greater. In the present invention, titanium oxide having a comparatively small average particle size, that is, fine particle size is used, and superior light reflection property can be obtained by dispersing an appropriate amount of alumina or the like on the surface of titanium oxide having a small particle size. The value of $(a/d^2)$ in (1) represents amount of aluminium per unit surface area of titanium oxide, and the value of $(c/d^2)$ in (2) represents amount of organic carbon derived from organosiloxane per unit surface area of titanium oxide.

By satisfying the ranges of (1) and (2), surface state of titanium oxide becomes suitable, and a polycarbonate resin superior in thermal stability, flame retardancy, and light reflection property can be obtained.

When the value of $(a/d^2)$ in (1) is less than 6.5, dispersion of titanium oxide in the composition becomes insufficient and secondary aggregation thereof tends to occur, and hence a molded article having superior appearance and reflectance cannot be obtained. In addition, when the value exceeds 15, thermal stability of the polycarbonate is deteriorated because basicity of titanium oxide particles becomes higher by the alumina treatment, and also impact resistance and forming stability may become inferior. When the value of $(c/d^2)$ in (2) is less than 5, since surface activity by titanium oxide and activity of titanium oxide particles to which basicity is added by alumina cannot be sufficiently reduced, thermal stability and adhesiveness of the polycarbonate resin composition are deteriorated and hence impact resistance and forming stability may become inferior. In addition, when the value exceeds 25, the organosiloxane-based surface treatment agent which is not chemically bonded to titanium oxide tends to vaporize during molding and causes mold taints.

Amount of the organosiloxane-based surface treatment agent can be specified as carbon content c (wt %) in the organosiloxane-based surface treatment agent which coats the surface of titanium oxide directly or indirectly. Carbon content c based on the total mass of titanium oxide-based additive (B) as 100 wt % is preferably 0.2 to 2 wt % or more. Carbon content c is more preferably 0.2 to 1.5 wt %, further more preferably 0.3 to 1.0 wt %, and particularly preferably 0.4 to 0.9 wt %. When carbon content c is less than 0.2 wt %, hydrophobicity of the surface of titanium oxide is lost and adhesion between surface-treated titanium oxide and polycarbonate decreases, resulting in inferior strength and appearance. In addition, carbon content decreases due to insufficient amount of treated organosiloxane, and hence thermal stability becomes inferior due to insufficient surface treatment.

Carbon content c can be controlled by adjusting concentration, dipping time, and spraying time of the organosiloxane-based surface treatment agent solution to be used, temperature and time of heat treatment, and the like in said surface treatment.

It should be noted that, carbon content c can be measured from an amount of combustion gas which is generated by combusting carbon in the surface treatment agent on the surface of titanium oxide in the titanium oxide-based additive (B) using a high-frequency induction heating furnace type carbon analyzer.

As mentioned above, carbon content c represents an abundance of carbon in organosiloxane directly or indirectly coating on the surface of titanium oxide. Carbon content c will be explained below, taking the case when polymethylhydrodiene siloxane is used as an example. That is, polymethylhydrodiene siloxane on the surface of titanium oxide is composed of: (1) the one existing in a state in which —OH group thereof is chemically bonded to —OH group or other reactive group of the titanium oxide surface; (2) the one existing in a free state without bonding to any substance or the one existing in a state in which organosiloxane has some interaction by weak hydrogen bond. In the present invention, carbon content c means total amount of the methyl carbon existing as these (1) and (2).

Therefore, carbon content c can be divided to carbon content [c1] of (1) chemically bonded organosiloxane, and carbon content [c2] of the above-described (2). Ratio of [c1] and [c2] is preferably [c1]:[c2]=10 to 90:90 to 10, more preferably [c1]:[c2]=20 to 90:80 to 10, further more preferably [c1]:[c2]=30 to 80:70 to 20, and particularly preferably [α] is 50% or more. It should be noted that separation of the above-describe component (1) and component (2) can be performed by extracting (2) with a solvent such as methanol.

Further, in the present invention, preferably a correlation between content [B] (wt %) of the titanium oxide-based additive (B) to the total amount (100 wt %) of the aromatic polycarbonate resin composition and said carbon content c satisfies the following condition.

$$1 \leq c \times [B] \leq 9 \tag{3}$$

In this case, the content [B] of component (B) is a content based on 100 wt % of the total resin composition including said components (A) to (C) and other component or additive which is further blended, if necessary.

When the value of $c \times [B]$ in the expression (3) exceeds 9, problems such as generation of gas during molding and the like occur, and also surface quality becomes worse such that silver streak occurs on the molded articles, and the like. By keeping the value 9 or less, deterioration in impact strength of the resin composition is improved, and decomposition of the polycarbonate resin is controlled.

The value of $c \times [B]$ is preferably 8 or less, and further more preferably 7 or less, and the lower limit thereof is preferably 2 or more, and further more preferably 3 or more. Range of the value of $c \times [B]$ is preferably 2 to 8, further more preferably 3 to 7, and particularly preferably 4 to 6.5.

In the present invention, content of titanium oxide-based additive (B) is in a range of 3 to 30 parts by weight based on 100 parts by weight of aromatic polycarbonate resin (A). When content of titanium oxide-based additive (B) is less than 3 parts by weight, light-blocking effect and reflective property of a molded article obtained from the resin composition become insufficient, and when it exceeds 30 parts by weight, impact resistance of the resin composition becomes insufficient. Content of titanium oxide-based additive (B) is preferably 3 to 25 parts by weight, more preferably 5 to 23 parts by weight, further more preferably 5 to 20 parts by weight, and particularly preferably 8 to 20 parts by weight based on 100 parts by weight of aromatic polycarbonate resin (A). It should be noted that, when titanium oxide is surface-treated with alumina hydrate, silicic acid hydrate, and organosiloxane-based surface treatment agent, mass of titanium oxide-based additive (B) means a mass including these treatment agents.

[4. Metal salt of aromatic sulfonic acid (C)]

Metal salt of aromatic sulfonic acid (C) to be used in the present invention is metal salts which are capable of functioning as a flame retardant to improve flame retardancy when added to the polycarbonate. Among them, metal salt of aromatic sulfonic acid and derivatives thereof are preferably used from the viewpoint of thermal stability when mixed with the polycarbonate resin.

It should be noted that, aromatic ring of metal salt of aromatic sulfonic acid (C) is not limited to monocyclic ring, but may be fused ring in which two or more aromatic rings are fused together. Further, metal salt of aromatic sulfonic acid (C) is not limited to the one having only one aromatic ring, but may be the one having two or more aromatic rings. Still further, metal salt of aromatic sulfonic acid (C) in the present invention encompasses metal salts of aromatic sulfonic acid compounds and derivatives thereof.

Preferably, the aromatic ring of this metal salt of aromatic sulfonic acid (C) does not have any substituent or has only an alkyl group having 1 to 4 carbon atoms as a substituent.

When a substituent binds to the aromatic ring of metal salt of aromatic sulfonic acid (C), the substituent is preferably an alkyl group having 1 to 4 carbon atoms (methyl group, ethyl group, propyl group, isopropyl group, butyl group, isobutyl group, and tert-butyl group). In the case of metal salt of aromatic sulfonic acid (C) in which the aromatic ring has an alkyl group having 5 or more carbon atoms or other substituent, flame retardancy tends to become diminished. Regarding the substituent, one aromatic ring may have two or more substituents, so long as the substituent is an alkyl group having 1 to 4 carbon atoms.

The metal of metal salt of aromatic sulfonic acid (C) is preferably alkali metal or alkaline earth metal. Alkali metal and alkaline earth metal include sodium, lithium, potassium, rubidium, cesium, beryllium, magnesium, calcium, strontium, and barium, and the like. Among them, sodium and potassium as an alkali metal, and magnesium, calcium and cesium as an alkaline earth metal are preferable from the viewpoints of compatibility with polycarbonate resin and addition of flame retardancy. Metal salt of aromatic sulfonic acid may be a mixture of two or more kinds.

Preferable example of metal salt of aromatic sulfonic acid (C) includes sodium diphenylsulfon-3-sulfonate, potassium diphenylsulfon-3-sulfonate, disodium diphenylsulfon-3,3'-disulfonate, dipotassium diphenylsulfon-3,3'-disulfonate, sodium benzenesulfonate, potassium benzenesulfonate, sodium para-toluenesulfonate, calcium para-toluenesulfonate, sodium dodecylbenzenesulfonate, sodium styrenesulfonate, and the like. Among them, sodium para-toluenesulfonate or potassium para-toluenesulfonate is preferably used from the viewpoints of flame retardancy, thermal stability and easy handling.

In addition, the pH (hydrogen ion concentration index) of the metal salt of aromatic sulfonic acid (C) in an aqueous solution is preferably 6.0 to 8.5, more preferably 6.5 to 8.0, and particularly preferably 6.6 to 8.3.

Here, the pH of the metal salt of aromatic sulfonic acid (C) in an aqueous solution means the pH of an aqueous solution of metal salt of aromatic sulfonic acid (C) in a concentration of 10 wt % at 23° C., measured by a pH meter.

When the pH of the above-described metal salt of aromatic sulfonic acid (C) is lower than 6.0, flame retardancy tends to be insufficient because reactivity between metal salt of aromatic sulfonic acid (C) and aromatic polycarbonate resin decreases, and when the pH exceeds 8.5, since decomposition of aromatic polycarbonate resin by metal salt of aromatic sulfonic acid (C) is greatly progressed, flame retardancy and thermal stability tend to become inferior.

Content of metal salt of aromatic sulfonic acid (C) is generally 0.01 to 1 parts by weight based on 100 parts by weight of aromatic polycarbonate resin (A). When the content is less than 0.01 parts by weight, an improvement effect for flame retardancy of polycarbonate resin composition to be obtained is insufficient, and when the content exceeds 1 part by weight, thermal stability during molding the polycarbonate resin composition and deterioration of physical properties in wet heat test occur. Content of metal salt of aromatic sulfonic acid (C) is preferably 0.03 to 0.8 parts by weight, more preferably 0.05 to 0.8 parts by weight, further more preferably 0.1 to 0.6 parts by weight, and particularly preferably 0.1 to 0.4 parts by weight based on 100 parts by weight of polycarbonate resin (A).

[5. Polytetrafluoroethylene (D)]

Polytetrafluoroethylene (D) is a polymer or a copolymer comprising a tetrafluoroethylene structure, and specifically includes tetrafluoroethylene resin, tetrafluoroethylene/hexafluoropropylene copolymer resin, and the like. Among them, tetrafluoroethylen resin is preferable.

In addition, polytetrafluoroethylene (D) preferably possesses a fibril-forming ability. By possessing a fibril-forming ability, drop preventing property during combustion can be remarkably improved.

The polytetrafluoroethylene possessing a fibril-forming ability is classified to "Type 3" in the ASTM standard. The polytetrafluoroethylene possessing a fibril-forming ability preferably includes, for example, Teflon (registered trademark) 6J produced by DuPont-Mitsui Fluorochemicals Co., Ltd. and Polyflon F201 L, FA500B and FA500C produced by Daikin Industries Ltd. In addition, an aqueous dispersion of the polytetrafluoroethylene includes Teflon (registered trademark) 31-JR produced by DuPont-Mitsui Fluorochemicals Co., Ltd., Fluon D-1 produced by Asahi Glass Co., Ltd., and a polytetrafluoroethylene compound having a multilayer structure obtained by polymerization of vinyl type monomer. Any type can be used for the resin composition of the present invention. In addition, these materials may be used alone or two or more types may be used in a mixed state.

Average particle size of the polytetrafluoroethylene is preferably 200 μm or more, more preferably 300 μm or more, and further more preferably 400 μm or more, and also preferably 600 μm or less, more preferably 550 μm or less, and further more preferably 500 μm or less, in an average particle size measured by the method according to JIS K6892.

In addition, bulk density of the polytetrafluoroethylene is preferably 0.3 g/ml or more, more preferably 0.35 g/ml or more, and further more preferably 0.4 g/ml or more, and also preferably 0.6 g/ml or less, more preferably 0.55 g/ml or less, and further more preferably 0.5 g/ml or less, in a bulk density measured by the method according to JIS K6892.

Polytetrafluoroethylene is composed of tetrafluoroethylene repeating units regularly linked together, taking a helical structure in which carbon main chain thereof is twisted little by little. The helical structure varies depending on temperature, and it takes a 13/6 helical structure (a structure in which the main chain rotates 6 revolutions per 13 carbon atoms) at 19° C. or lower, whereas the helical structure is untwisted a little to shift to a 15/7 helical structure (a structure in which the main chain rotates 7 revolutions per 15 carbon atoms) at a temperature above 19° C.

When polytetrafluoroethylene takes the 15/7 helical structure, it becomes viscous and loses dispersibility, and hence tends to form a lump or exhibit fractionating behavior, and as a result, an improvement effect for flame retardancy tends to be deteriorated. Accordingly, polytetrafluoroethylene (D) is preferably mixed with other components while it is maintained at a temperature of 19° C. or lower.

Specifically, it is preferable to maintain polytetrafluoroethylene (D) at 19° C., if necessary, in a refrigerator, and preferably to mix polytetrafluoroethylene (D) with a part of aromatic polycarbonate resin (A) similarly maintained at 19° C. in advance, and to carry out mixing and melt kneading this premix with residual part of aromatic polycarbonate resin (A) and other components, similarly to the above.

In order to further improve an appearance of molded articles obtained by injection molding of the resin composition containing polytetrafluoroethylene, polytetrafluoroethylene coated with an organic polymer can be used.

By using the tetrafluoroethylene resin coated with an organic polymer, dispersibility of the resin and surface appearance of molded articles can be improved, and foreign substances on the surface of molded articles can be inhibited. The fluoroethylene resin coated with organic polymer can be produced by various known methods. Those methods include, for example, (1) a production method by mixing a polytetrafluoroethylene particle aqueous dispersion and an organic polymer particle aqueous dispersion, and then obtaining powder of the mixture by coagulation or spray drying; (2) a production method by polymerizing a monomer constructing the organic polymer in the presence of a polytetrafluoroethylene particle aqueous dispersion, and then obtaining powder of the mixture by coagulation or spray drying; (3) a production method by performing emulsion polymerization of a monomer having an ethylenically unsaturated bond in a mixture of a polytetrafluoroethylene particle aqueous dispersion and an organic polymer particle aqueous dispersion, and then obtaining powder of the mixture by coagulation or spray drying; and the like.

In the polytetrafluoroethylene coated with organic polymer, content of polytetrafluoroethylene in the coated polytetrafluoroethylene is preferably in a range of 40 to 95 wt %, more preferably 43 to 80 wt %, further more preferably 45 to 70 wt %, and particularly preferably 47 to 60 wt %. As a specified coated polytetrafluoroethylene of the present invention, for example, Metablen A-3800, A-3700 and KA-5503 produced by Mitsubishi Rayon Co., Ltd., Poly TS AD001 produced by PIC (Pacific Interchem Corp.), and the like can be preferably used.

In the present invention, content of polytetrafluoroethylene (D) is 0.05 to 0.9 parts by weight based on 100 parts by weight of aromatic polycarbonate resin (A). Lower limit of the content is preferably 0.08 parts by weight, and particularly preferably 0.1 parts by weight or more, and the upper limit of the content is preferably 0.7 parts by weight or less, and particularly preferably 0.5 parts by weight or less. It should be noted that, when the coated polytetrafluoroethylene is used, an amount to be added corresponds to an amount of pure polytetrafluoroethylene. When content of polytetrafluoroethylene (D) is less than 0.05 parts by weight, flame retardancy is not sufficient, whereas the content exceeding 0.9 parts by weight tends to cause deterioration in appearance of molded articles.

[6. Other Components]

In the aromatic polycarbonate resin composition of the present invention, in addition to the components described above, if necessary, other resins and various types of resin additives and the like may be further used within a range not to impair the effect of the present invention.

Other resins, specifically, include, for example, elastomer, aromatic vinyl compound-diene-vinyl cyanide type copolymer, polyolefin type resin such as polyethylene resin and polypropylene resin, polyamide resin, polyimide resin, polyetherimide resin, polyurethane resin, polyphenyleneether resin, polyphenylenesulfide resin, polysulfon resin, polymethacrylate resin, polyester resin, and the like.

<Elastomer>

The aromatic polycarbonate resin of the present invention may contain an elastomer as other component. By containing an elastomer, impact resistance of the polycarbonate resin composition can be improved.

As the elastomer to be used in the present invention, a graft copolymer in which a rubber component has been graft-copolymerized with a monomer component copolymerizable thereto is particularly preferably. Method for producing the graft copolymer may be any of bulk polymerization, solution polymerization, suspension polymerization, emulsion polymerization, and the like, and copolymerization method may be either one-step graft copolymerization or multistep graft copolymerization.

Glass transition temperature of the rubber component is generally 0° C. or lower, more preferably −20° C. or lower, and further more preferably −30° C. or lower. Specific example of the rubber component includes polybutadiene, polyisoprene rubber, poly(alkyl acrylate) rubber such as poly(butyl acrylate), poly(2-ethylhexyl acrylate), butyl acrylate/2-ethylhexyl acrylate copolymer, silicone-based rubber such as polyorganosiloxane rubber, butadiene-acrylic complexed rubber, IPN type complexed rubber composed of polyorganosiloxane rubber and poly(alkyl acrylate) rubber, styrene-butadiene rubber, ethylene-α olefin-based rubber such as ethylene-propylene rubber, ethylene-butane rubber and ethylene-octene rubber, ethylene-acrylic rubber, fluorine-containing rubber, and the like. These rubbers may be used alone, or two or more types may be used in a mixed state. Among them, polybutadiene, poly(alkyl acrylate) rubber, polyorganosiloxane rubber, IPN (Interpenetrating Polymer Network) type complexed rubber composed of polyorganosiloxane rubber and poly(alkyl acrylate) rubber, and styrene-butadiene rubber are preferable from the viewpoints of mechanical properties and surface appearance.

Specific example of the monomer component graft-copolymerizable to the rubber component includes aromatic vinyl compound, vinyl cyanide compound, (meth)acrylate ester compound, (meth)acrylic acid compound, epoxy-group-containing (meth)acrylate ester compound such as glycidyl (meth)acrylate and the like; maleimide compound such as maleimide, N-methyl maleimide, N-phenyl maleimide, α,β-unsaturated carboxylic acid compound such as maleic acid, phthalic acid, itaconic acid and anhydride thereof (for example, maleic anhydride and the like), and the like. These monomer components may be used alone, or two or more types may be used in combination. Among these compounds, preferably aromatic vinyl compound, vinyl cyanide compound, (meth)acrylate ester compound, and (meth)acrylic acid compound, and more preferably (meth)acrylate ester compound can be used from the viewpoints of mechanical properties and surface appearance. Specific example of (meth)acrylate ester compound includes methyl(meth)acrylate, ethyl(meth)acrylate, butyl(meth)acrylate, cyclohexyl (meth)acrylate, octyl(meth)acrylate, and the like.

As for the graft-copolymer copolymerized with rubber component, the one of core-shell type graft-copolymer is preferable from the viewpoints of impact resistance and surface appearance. Among them, a core-shell type graft-copolymer composed of a core layer of at least one kind of rubber component selected from polybutadiene-containing rubber, poly(butyl acrylate)-containing rubber, organosiloxane rubber, and IPN type complexed rubber composed of polyorganosiloxane rubber and poly(alkyl acrylate) rubber, and a shell layer formed by copolymerizing a (meth)acrylate ester in the circumference thereof is particularly preferable. The above-described core/shell type graft-copolymer contains preferably 40 wt % or more of rubber component, and more preferably 60 wt % or more. In addition, (meth)acrylate ester is preferably contained 10 wt % or more.

Preferable specific example of these core/shell type graft-copolymer includes methyl methacrylate-butadiene-styrene copolymer (MBS), methyl methacrylate-acrylonitrile-butadiene-styrene copolymer (MABS), methyl methacrylate-butadiene copolymer (MB), methyl methacrylate-acrylic rubber copolymer (MA), methyl methacrylate-acrylic rubber-styrene copolymer (MAS), methyl methacrylate-acrylic-butadiene rubber copolymer, methyl methacrylate-acrylic/butadiene rubber-styrene copolymer, methyl methacrylate-(acrylic/silicone IPN rubber) copolymer, and the like. Such elastomeric polymer may be used alone or two or more kinds may be used in combination.

Such core/shell type graft-copolymer includes, for example, "Paraloid (registered trademark, hereinafter same as above) EXL2602", "Paraloid EXL2603", "Paraloid EXL2655", "Paraloid EXL2311", "Paraloid EXL2313", "Paraloid EXL2315", "Paraloid KM330", "Paraloid KM336P", and "Paraloid KCZ201" produced by Rohm and Haas Japan K.K., "Metablen (registered trademark, hereinafter same as above) C-223A", "Metablen E-901", "Metablen S-2001", and "Metablen SRK-200" produced by Mitsubishi Rayon Co., Ltd., Kaneace (registered trademark, hereinafter same as above) M-511", "Kaneace M-600", "Kaneace M-400", "Kaneace M-580", and "Kaneace MR-01", and the like.

Preferable content of the elastomer is 0.1 to 10 parts by weight based on 100 parts by weight of the aromatic polycarbonate resin. When the content is less than 0.1 parts by weight, the improvement effect of impact resistance by the elastomer becomes insufficient, and when the content exceeds 10 parts by weight, inferior appearance of the molded articles and deterioration of heat resistance of the aromatic polycarbonate resin composition are resulted. Lower limit of the content is preferably 0.5 parts by weight or more, and more preferably 1 part by weight or more, and upper limit of the content is preferably 7.5 parts by weight or less, more preferably 5 parts by weight or less, and particularly preferably 4 parts by weight or less.

<Aromatic Vinyl Compound-Diene-Vinyl Cyanide Type Copolymer>

The aromatic polycarbonate resin composition of the present invention can contain an aromatic vinyl compound-diene-vinyl cyanide type copolymer.

This copolymer is composed of aromatic vinyl monomer, diene, vinyl cyanide monomer, and if necessary, other copolymerizable monomer.

Diene includes butadiene, isoprene, and the like, and preferably diene-based rubber polymerized in advance, for example, polybutadiene type rubber, acrylonitrile-butadiene copolymer type rubber, styrene-butadiene copolymer type rubber, polyisoprene type rubber, and the like. These can be used alone or two or more types can be used in combination. Particularly preferably, polybutadiene type rubber and/or styrene-butadiene copolymer type rubber is used.

Vinyl cyanide monomer includes acrylonitrile, methacrylonitrile, and the like, and particularly acrylonitrile is preferable.

Aromatic vinyl monomer includes styrene, α-methylstyrene, p-methylstyrene, p-t-butylstyrene, vinyltoluene, and the like, and particularly styrene and/or α-methylstyrene is preferable.

Composition ratio of copolymer is not particularly limited, but preferably 10 to 70 parts by weight of the diene type rubber based on 100 parts by weight of copolymer from the viewpoints of formability/processability and impact resistance of the resin composition to be obtained. Similarly, amount of vinyl cyanide monomer is preferably 20 to 80 parts by weight.

Production method for the above-described copolymer is not particularly limited, and heretofore known methods such as emulsion polymerization, solution polymerization, bulk polymerization, suspension polymerization, bulk/suspension polymerization, and the like can be used.

Content of the aromatic vinyl monomer-diene-vinyl cyanide type copolymer is 5 to 30 wt % based on 100 wt % of total of the aromatic polycarbonate resin and the aromatic vinyl monomer-diene-vinyl cyanide type copolymer. By containing the aromatic vinyl monomer-diene-vinyl cyanide type copolymer in such way, impact resistance and fluidity of the aromatic polycarbonate resin composition of the present invention can be improved. More preferably content is 7 to 25 wt %.

[7. Other Additives]

The aromatic polycarbonate resin composition of the present invention may contain one or more kinds selected from various additives within a range where the effects of the present invention are not impaired. Such additive includes an additive selected from the group consisting of phosphorus-based stabilizer, phenol-based antioxidant, ultraviolet absorbing agent, mold release agent, fluorescent whitening agent, inorganic filler, and colorant, and the like.

<Phosphorus-Based Stabilizer>

In the resin composition of the present invention, it is preferable to add a phosphorus-based thermal stabilizer such as phosphite ester, phosphate ester to improve thermal stability.

Phosphite ester includes, for example, triester, diester, monoester, or the like of phosphorous acid such as triphenyl phosphite, tris-nonylphenyl phosphite, tris-(2,4-di-t-butylphenyl)phosphite, trinonyl phosphite, tridecyl phosphite, trioctyl phosphite, trioctadecyl phosphite, distearylpentaerythritol diphosphite, tricyclohexyl phosphite, monobutyldiphenyl phosphite, monooctyldiphenyl phosphite, bis(2,4-di-tert-butylphenyl)pentaerythritol phosphite, bis(2,6-di-tert-butyl-4-methylphenyl)pentaerythritol phosphite, 2,2-methylenebis(4,6-di-tert-butylphenyl)octyl phosphite, and the like.

Phosphate ester includes trimethyl phosphate, triethyl phosphate, tributyl phosphate, trioctyl phosphate, triphenyl phosphate, tricresyl phosphate, tris(nonylphenyl)phosphate, 2-ethylphenyldiphenyl phosphate, tetrakis(2,4-di-t-butylphenyl)-4,4-diphenyl phosphonite, and the like.

Among the above-described phosphorus-based thermal stabilizers, distearylpentaerythritol diphosphite, bis(2,4-di-tert-butylphenyl)pentaerythritol phosphite, bis(2,6-di-tert-butyl-4-methylphenyl)pentaerythritol phosphite, and tris(2,4-di-tert-butyophenyl)phosphite are preferable, and bis(2,6- di-tert-butyl-4-methylphenyl)pentaerythritol phosphite and tris(2,4-di-tert-butyophenyl)phosphite are particularly preferable.

It should be noted that, the thermal stabilizers may be used alone or two or more kinds may be used in combination.

Content of the phosphorus-based stabilizer in the resin composition of the present invention is preferably 0.005 to 0.2 parts by weight, and more preferably 0.01 to 0.1 parts by weight based on 100 parts by weight of the aromatic polycarbonate resin. It is preferable that content of the thermal stabilizer is within the above-described range, because hydrolysis does not occur and thermal stability can be improved.

<Phenol-Based Antioxidant>

In the resin composition of the present invention, it is preferable to add a phenol-based antioxidant.

More specifically, the phenol-based antioxidant includes 2,6-di-tert-butyl-4-methylphenol, n-octadecyl-3-(3',5'-di-tert-butyl-4'-hydroxyphenyl) propionate, tetrakis[methylene-3-(3,5-di-tert-butyl-4-hydroxyphenyl)propionate]methane, tris(3,5-di-tert-butyl-4-hydroxybenxyl) isocyanurate, 4,4'-butylidene-bis(3-methyl-6-tert-butylphenyl), triethyleneglycol-bis[3-(3-tert-butyl-hydroxy-5-methyl phenyl)propionate], and 3,9-bis{2-[3-(3-tert-butyl-4-hydroxy-5-methylphenyl)propionyloxy]-1,1-dimethylethyl}-2,4,8,10-tetraoxaspiro[5,6]undecane, and the like. Among them, tetrakis[methylene-3-(3,5-di-tert-butyl-4-hydroxyphenyl) propionate]methane is preferable. These antioxidants may be used alone or two or more kinds may be used in combination.

Content of the phenol-based antioxidant in the resin composition of the present invention is preferably 0.02 to 0.5 parts by weight based on 100 parts by weight of the aromatic polycarbonate resin component. It is preferable that the content is within this range, because antioxidant property can be improved without inhibiting the effects of the present invention.

<Ultraviolet Absorbing Agent>

Ultraviolet absorbing agent can be added to the resin composition of the present invention. When molded articles made of the resin composition of the present invention are exposed to a light such as sunlight and fluorescent lamp, they tend to become yellowish due to ultraviolet ray. The yellowing of the articles can be prevented or delayed by adding the ultraviolet absorbing agent. Ultraviolet absorbing agent includes benzophenone type, benzotriazole type, phenyl salicylate type, hindered amine type, and the like.

Specific example of benzophenone type ultraviolet absorbing agent includes 2,4-dihydroxy-benzophenone, 2-hydroxy-4-methoxy-benzophenone, 2-hydroxy-4-n-octoxy-benzophenone, 2-hydroxy-4-dodecyloxy-benzophenone, 2-hydroxy-4-octadecyloxy-benzophenone, 2,2'-hihydroxy-4-methoxy-benzophenone, 2,2'-hihydroxy-4,4'-dimethoxy-benzophenone, 2,2',4,4'-tetrahydroxy-benzophenone, and the like.

Specific example of benzotriazole type ultraviolet absorbing agent includes 2-(2H-benzotriazole-2-yl)-p-cresol, 2-(2H-benzotriazole-2-yl)-4,6-bis(1-methyl-1-phenylmethyl)phenol, 2-[5-chloro(2H)-benzotriazole-2-yl]-4-methyl-6-(tert-butyl)phenol, 2,4-di-tert-butyl-6-(5-chlorobenzotriazole-2-yl)phenol, 2-(2H-benzotriazole-2-yl)-4-(1,1,3,3-tetrabutyl)phenol, 2,2'-methylene-bis-[6-(2H-benzotriazole-2-yl)-4-(1,1,3,3-tetrabutyl)phenol], and the like.

Specific example of phenyl salicylate type ultraviolet absorbing agent includes phenyl salicylate, 2,4-di-tert-butylphenyl-3,5-di-tert-butyl-4-hydroxybanzoate, and the like.

Specific example of hindered amine type ultraviolet absorbing agent includes bis-(2,2,6,6-tetramethylpyperidine-4-yl) sebacate, and the like.

Ultraviolet absorbing agent may be used alone or two or more kinds may be used in combination.

Content of the ultraviolet absorbing agent in the resin composition of the present invention is preferably 0.001 to 1 parts by weight, more preferably 0.005 to 0.8 parts by weight, and further more preferably 0.01 to 0.5 parts by weight based on 100 parts by weight of the aromatic polycarbonate resin. It is preferable that content of the ultraviolet absorbing agent is within the above-described range, because weather resistance can be improved, without occurring decrease in luminescence from an organic ultraviolet luminescent fluorescent substance by exciting light absorption and bleed out on the surface of molded articles.

<Mold Release Agent>

The resin composition of the present invention preferably contains a mold release agent.

Preferable mold release agent is a compound selected from aliphatic carboxylic acid, aliphatic carboxylate ester, and aliphatic hydrocarbon compound having a number average molecular weight of 200 to 15000. Among them, a compound selected from aliphatic carboxylic acid and aliphatic carboxylate ester is preferably used.

Aliphatic carboxylic acid includes saturated or unsaturated aliphatic monocarboxylic acid, dicarboxylic acid, or tricarboxylic acid. In the present specification, the term "aliphatic carboxylic acid" is used for a meaning encompassing also alicyclic carboxylic acid. Among aliphatic carboxylic acids, mono- or di-carboxylic acid having 6 to 36 carbon atoms is preferable, and aliphatic saturated monocarboxylic acid having 6 to 36 carbon atoms is more preferable. Specific example of such aliphatic carboxylic acid includes palmitic acid, stearic acid, valeric acid, caproic acid, capric acid, lauric acid, arachic acid, behenic acid, lignoceric acid, cerotic acid, melissic acid, tetratriacontanoic acid, montanoic acid, glutaric acid, adipic acid, azelaic acid, and the like.

As an aliphatic carboxylic acid component constituting the aliphatic carboxylate ester, the same acid as said aliphatic carboxylic acid can be used. On the other hand, as an alcohol component constituting the aliphatic carboxylate ester, saturated or unsaturated monohydric alcohol, saturated or unsaturated polyhydric alcohol, and the like are included. These alcohols may have a substituent such as fluorine atom, aryl group, and the like. Among these alcohols, monohydric or polyhydric saturated alcohol having 30 or less carbon atoms is preferable, and aliphatic saturated monohydric alcohol or polyhydric alcohol having 30 or less carbon atoms is further preferable. Herein, aliphatic alcohol also encompasses alicyclic alcohols. Specific example of such alcohol includes octanol, decanol, dodecanol, stearyl alcohol, behenyl alcohol, ethylene glycol, diethylene glycol, glycerin, pentaerythritol, 2,2-dihydroxyperfluoropropanol, neopentylene glycol, ditrimethylolpropane, dipentaerythritol, and the like. These aliphatic carboxylate esters may contain aliphatic carboxylic acid and/or alcohol as an impurity, and also be a mixture of a plurality of compounds. Specific example of the aliphatic carboxylate ester includes bees wax (a mixture consisting mainly of myricyl palmitate), stearyl stearate, behenyl behenate, octyldodecyl behenate, glycerin monopalmitate, glycerin monostearate, glycerin distearate, glycerin tristearate, pentaerythritol monopalmitate, pentaerythritol monostearate, pentaerythritol distearate, pentaerythritol tristearate, and pentaerythritol tetrastearate.

The mold release agent may be used alone or two or more kinds may be used in combination.

Content of the mold release agent in the present invention is preferably 0.01 to 1 parts by weight based on 100 parts by weight of the aromatic polycarbonate resin. It is preferable that content of the mold release agent is within the above-described range, because mold release effect can be obtained without reducing hydrolysis resistance.

<Fluorescent Whitening Agent>

In the present invention, any heretofore known fluorescent whitening agent may be used within a range where the effects of the present invention are not impaired. Such fluorescent whitening agent includes various compounds, and specific example includes coumarin derivatives, naphthotriazolylstilbene derivatives, benzoxazol derivatives, oxazol derivatives, benzimidazol derivatives, and diaminostilbene disulfonate derivatives, and the like. In addition, as a commercial product, Hakkol (trade name) PSR (3-phenyl-7-(2H-naphtho[1,2-d]-triazol-2-yl)coumarin) from Hakkol Chemical, Hostalux (trade name) KCB (benzoxazol derivative) from Hoechst AG, and Whiteflour (trade name) PSN Conc. (oxazol type compound) from Sumitomo Chemical Co., Ltd. can be purchased.

Preferable content of the fluorescent whitening agent is 0.005 to 0.1 parts by weight based on 100 parts by weight of the aromatic polycarbonate resin. When the content is less than 0.005 parts by weight, whitening effect is insufficient, and when the content exceeds 0.1 parts by weight, yellow color tends to become deeper. More preferable content of the fluorescent whitening agent is 0.01 to 0.05 parts by weight based on 100 parts by weight of the aromatic polycarbonate resin.

<Inorganic Filler>

The aromatic polycarbonate resin in the present invention can contain inorganic filler in order to improve strength and rigidity. Shape of the inorganic filler may be any of needle-like, plate-like, amorphous, or the like. Specific example of the inorganic filler includes glass-based filler such as glass fiber (chopped strand), short glass fiber (milled fiber), glass flake, glass beads; carbon-based filler such as carbon fiber, short carbon fiber, carbon nanotube, graphite; whisker such as potassium titanate, aluminium borate; silicate compound such as talc, mica, wollastonite, kaolinite, xonotlite, sepiolite, attapulgite, montmorillonite, bentonite, smectite; silica, alumina, calcium carbonate, and the like. Among them, talc, mica, wollastonite, and kaolinite are preferable for the purpose of obtaining superior surface designing. Two or more kinds of these substances may be used in combination.

Content of the inorganic filler 1 to 60 parts by weight based on 100 parts by weight of the aromatic polycarbonate resin. When content of the inorganic filler is less than 1 part by weight, the reinforcement effect may be insufficient. Also when the content exceeds 60 parts by weight, appearance and impact resistance becomes inferior and fluidity may become insufficient. Content of the inorganic filler is preferably 3 to 50 parts by weight, and particularly preferably 5 to 30 parts by weight.

The inorganic filler is preferably the granular one obtained by granulating the filler having an average particle size of 0.01 to 100 μm using a binder, from the viewpoint of thermal stability when contained in the resin composition. Average particle size is 0.05 to 50 μm, and further preferably 0.1 to 25 μm. When average particle size is too small, the reinforcement effect may become insufficient, contrary when average particle size is too large, an adverse effect tends to be given to appearance of product, and further impact resistance may also become insufficient. Average particle size is most preferably 0.2 to 15 μm, and particularly preferably 0.3 to 10 μm. It should be noted that, in the present invention, average particle size of the inorganic filler means $D_{50}$ measured by liquid phase settling method using X-ray transmission. Equipment capable of performing such measurement includes Sedigraph particle size analyzer (manufactured by Micromeritics Instruments Corp.) "Model 5100".

Inorganic filler as a raw material of the granular inorganic filler includes silicate compound such as wollastonite, talc, mica, xonotlite, sepiolite, attapulgite, kaolinite; complex oxide such as potassium titanate, oxidized alumina, zinc oxide; carbonate compound such as calcium carbonate; sulfate compound such as barium sulfate, calcium sulfate; carbon-based filler such as graphite; silica; glass-based filler such as glass flake, glass beads; aluminium borate; and the like. These fillers may be used alone or two or more substances may be used in combination.

<Colorant>

The aromatic polycarbonate resin composition of the present invention can contain colorant. Colorant includes, for example, inorganic pigment, organic pigment, and organic dye. Content of the colorant in the present invention is less than 3 parts by weight based on 100 parts by weight of the aromatic polycarbonate resin.

Inorganic pigment includes, for example, carbon black; sulfide-based pigment such as cadmium red, cadmium yellow; silicate-based pigment such as ultramarine; oxide-based pigment such as zinc oxide, Bengal red, chromium oxide, iron black, titan yellow, zinc-iron-based brown, titanium-cobalt-based green, cobalt green, cobalt blue, copper-chromium-based black, copper-iron-based black; chromate-based pigment such as chrome yellow, molybdate orange; ferrocyan-based pigment such as iron blue; and the like.

Organic pigment and organic dye include, for example, phthalocyanine type colorant such as copper phthalocyanine blue, copper phthalocyanine green; azo type colorant such as nickel azo yellow; fused polycyclic colorant such as thioindigo type, perinone type, perilene type, quinacridone type, dioxazine type, isoindolinone type, quinophthalone type; and colorant of anthraquinone type, heterocyclic type, and methyl type; and the like.

Among them, carbon black, cyanine type, quinolone type, anthraquinone type, and phthalocyanine type compounds are preferable from the viewpoint of thermal stability.

It should be noted that the colorant may be contained alone or two or more kinds may be contained in any combination and ratio. In addition, the colorant may be used in a form of a masterbatch mixed with polystyrene-based resin, polycarbonate-based resin, or acrylic-based resin for the purpose of improving handling in extrusion and dispersibility into the resin composition.

<Other Additives>

The resin composition of the present invention can contain antistatic agent, antifog additive, lubricant/antiblocking agent, flow modifier, plasticizer, dispersing agent, fungicide, and the like, if necessary, within a range where the effects of the present invention are not impaired. These additives may be used alone or two or more kinds may be used in combination.

[8. Production Method of Polycarbonate Resin Composition]

The aromatic polycarbonate resin composition of the present invention is produced by mixing respective components constituting the aromatic polycarbonate resin composition and melt-kneading the mixture. As for method thereof, heretofore known method to be applied to a thermoplastic resin composition can be applied. The method includes, for example, a method using ribbon blender, Henschel mixer, Banbury mixer, drum tumbler, single- or twin-screw extruder, cokneader, or the like, and the like. In addition, temperature in the melt-kneading is not particularly limited, but usually in a range of 240 to 320° C.

[8.1 Masterbatch]

<Polycarbonate-Polytetrafluoroethylene Masterbatch>

In the aromatic polycarbonate resin composition of the present invention, a production method in which an aromatic polycarbonate, said titanium oxide-based additive, flame retardant, and polytetrafluoroethylene as a flame retarding auxiliaries, and also other necessary components are collectively blended, may be used, but preferably a production method described below in which after obtaining a masterbatch, said masterbatch is melt-kneaded with the polycarbonate resin composition, is used.

Specifically, in the aromatic polycarbonate resin composition of the present invention, in order to improve dispersibility of polytetrafluoroethylene in the resin composition or molded articles, preferably polytetrafluoroethylene having a crystalline structure of 13/6 helical structure is blended with a polycarbonate resin having a granular form and specific surface area of 0.01 to 5 $mm^2/g$, and 60 to 95 wt % of which have a particle size of 180 to 1700 μm, to obtain a polycarbonate-polytetrafluoroethylene masterbatch which contains a higher content of polytetrafluoroethylene than in the final composition, after that, said masterbatch is melt-kneaded with a necessary amount of polycarbonate resin in a pellet form or a granular form to obtain the aromatic polycarbonate resin composition.

Since polytetrafluoroethylene has a crystal structure having 13/6 helical structure at a temperature of 19° C. or lower, specifically by blending polytetrafluoroethylene maintained in a state at a temperature of 19° C. or lower into the polycarbonate resin, the polycarbonate-polytetrafluoroethylene masterbatch can be obtained.

In this case, as for the polycarbonate resin, preferably the one maintained in a state at a temperature of 19° C. or lower is used, further preferably an atmospheric temperature during mixing is 19° C. or lower, and particularly preferably the polycarbonate-polytetrafluoroethylene masterbatch after blending is maintained at 19° C. or lower.

Production method of the polycarbonate-polytetrafluoroethylene masterbatch includes a method to mix with using ribbon blender, Henschel mixer, Bambury mixer, drum tumbler, and the like, and use of drum tumbler is preferable. Content of polytetrafluoroethylene in the polycarbonate-polytetrafluoroethylene masterbatch is preferably 20 to 100 parts by weight, and further preferably 25 to 50 parts by weight based on 100 parts by weight of the polycarbonate resin. By melt-kneading such polycarbonate-polytetrafluoroethylene masterbatch in the production, appearance of molded articles becomes more superior.

<Polycarbonate-Titanium Oxide-Based Additive Masterbatch>

In addition, it is also preferable that titanium oxide-based additive (B) is mixed with at least a part of aromatic polycarbonate rein (A) in advance to obtain a masterbatch, after that the masterbatch is mixed and melt-kneaded with residual polycarbonate resin (A) and other components.

By making the masterbatch of titanium oxide-based additive (B) and at least a part of aromatic polycarbonate resin (A), the titanium oxide-based additive surface-treated with organosiloxane has an extremely improved affinity to the polycarbonate resin. By mixing and melt-kneading this masterbatch with residual aromatic polycarbonate resin (A) and other components, secondary coagulation of titanium oxide-based additive (B) in molding can be prevented, and improvement effects in light beam reflectance, light-blocking effect, light resistance, hue, appearance of molded articles can be more enhanced.

In the production of the polycarbonate-titanium oxide-based additive masterbatch, it is preferable to blend the titanium oxide-based additive with the polycarbonate resin having a specific surface area of 0.01 to 5 $mm^2/g$ and granular form, and 60 to 95 wt % of which has a particle size of 180 to 1700 μm, to obtain the polycarbonate-titanium oxide-based additive masterbatch which contains a higher content of the titanium oxide-based additive than the final content. The resultant masterbatch is melt-kneaded with a necessary amount of polycarbonate resin in a pellet form or a granular form and desired other components, to obtain the predetermined composition of polycarbonate resin composition.

Production method of the polycarbonate-titanium oxide-based additive masterbatch includes a method to mix with using ribbon blender, Henschel mixer, Bambury mixer, drum tumbler, and the like, and use of Henschel mixer is preferable. Content of titanium oxide-based additive in the polycarbonate-titanium oxide-based additive masterbatch is preferably 20 to 100 parts by weight, and further preferably 25 to 50 parts by weight based on 100 parts by weight of the polycarbonate resin. By melt-kneading such polycarbonate-titanium oxide-based additive masterbatch in the production process, appearance of molded articles becomes more superior.

<Polycarbonate-Metal Salt Type Flame Retardant Masterbatch>

In addition, in order to improve dispersibility of the metal salt of aromatic sulfonic acid, and as a result, obtain stable flame retardancy, it is preferable to make a masterbatch of the metal salt of aromatic sulfonic acid and the aromatic polycarbonate resin in advance. In making the masterbatch, the metal salt of aromatic sulfonic acid is blended with the polycarbonate resin having a specific surface area of 0.01 to 5 $mm^2/g$ and granular form, and 60 to 95% by mas of which has a particle size of 180 to 1700 to obtain the polycarbonate-metal salt of aromatic sulfonic acid masterbatch which contains a higher content of the metal salt of aromatic sulfonic acid than the final content. The resultant masterbatch is melt-kneaded with a necessary amount of polycarbonate resin in a pellet form or a granular form and desired other components, to obtain the predetermined composition of aromatic polycarbonate resin composition.

Production method of the polycarbonate-metal salt of aromatic sulfonic acid masterbatch includes a method using ribbon blender, Henschel mixer, Bambury mixer, drum tumbler, and the like, and use of Henschel mixer is preferable. Content of metal salt of aromatic sulfonic acid in the polycarbonate-metal salt of aromatic sulfonic acid masterbatch is 0.5 parts by weight or more, preferably 0.8 parts by weight or more, and further more preferably 1 part by weight by mass or more based on 100 parts by weight of the polycarbonate resin, and 5 parts by weight or less, preferably 4 parts by weight or less, and further more preferably 3 parts by weight or less based on 100 parts by weight of the polycarbonate resin.

By melt-kneading the polycarbonate-metal salt of aromatic sulfonic acid masterbatch in the production together with the polycarbonate-polytetrafluoroethylene masterbatch and/or polycarbonate-titanium oxide-based additive masterbatch, not only appearance of molded articles becomes more superior, but variation in flame retardancy can be controlled.

As the method for mixing and melt-kneading the masterbatches described above with residual aromatic polycarbonate resin (A) and other components, the common method same as mentioned above can be applied. Temperature in melt-kneading is not particularly limited, but generally in a range of 240 to 320° C.

In addition, since polytetrafluoroethylene (D) changes its crystal structure at a temperature of 19° C. as mentioned above, it is preferable to maintain polytetrafluoroethylene (D) at a temperature of 19° C. or lower and mix with other components in a state in which 13/6 helical structure is maintained.

Specifically, preferably polytetrafluoroethylene (D) is maintained at a temperature of 19° C. or lower, if necessary, maintained in the refrigerator, and mixed with a part of aromatic polycarbonate resin (A) preferably maintained at a temperature of 19° C. or lower in the same way in advance, and this premix is then mixed and melt kneaded with residual aromatic polycarbonate resin (A) and other components in the same way as mentioned above.

By these procedures, polytetrafluoroethylene (D) hardly forms a lump or exhibits fractionation behavior, and flame retarding effect can be improved.

[9. Molding Method]

The aromatic polycarbonate resin composition of the present invention can be used as a molding material for various kinds of molded articles. In this case, as an applicable molding method, injection molding method is suitably applied. It should be noted that the injection molding method here means a wide range of injection method including ultra-high-speed injection molding method, injection compression molding method, two-color molding method, blow molding method such as gas assist, molding method using an insulated mold, molding method using a rapid heating mold, foaming (including supercritical fluid) method, insert molding method, IMC (In-mold coating) molding method, and the like.

[10. Polycarbonate Resin Molded Article]

The molded article of the present invention is obtained by molding the aromatic polycarbonate resin composition of the present invention mentioned above. Since the molded article of the present invention is superior in light resistance, light-blocking effect, light beam reflectance, hue, flame retardancy, and molding stability, and maintains at the same time impact resistance, heat resistance, dimensional stability, appearance traits, and the like which are essential characteristics to be possessed by the polycarbonate resin, it can be used widely as light reflective members such as light beam reflection plate for backlight of liquid crystal display devices, light reflection frame or light reflection sheet, illumination devices for electric/electronic equipment, advertising light and the like, automobile devices such as instrument panel for automobile, with utilizing these features. In particular, due to superior flame retardancy, light reflectivity, impact resistance thereof, it is useful for applications of light beam reflection plate for backlight of liquid crystal display devices and reflection frame parts.

EXAMPLES

Hereinafter, the present invention is explained by showing Examples and Comparative Examples, but the present invention should not be construed to be limited to the following Examples.

It should be noted that, in the following Examples and Comparative Examples, part(s) and % mean part(s) by weight and wt %, respectively, unless otherwise noted.

Measurement/evaluation methods used in Examples and Comparative Examples are as follows.

Measurement/Evaluation Methods

[Measurement of Surface Treatment Components of Titanium Oxide]

As for amount of Al "a" of the titanium oxide-based additive, fluorescent X-ray analysis was carried out using a wavelength-dispersive X-ray fluorescence spectrometer ZSX mini II manufactured by Rigaku Corp., under the following conditions of X-ray tube: palladium tube, voltage: 40 kV/tube current 1.2 mA, diameter of measurement area: 30 mm, and vacuum atmosphere, and "a" was calculated from the intensity ratio of Ti and Al spectra. Further, content of carbon "c" was measured using a high-frequency induction furnace type carbon analyzer EMIA-921V manufactured by Horiba, Ltd., under the following conditions of anode output: 2.3 kW, frequency: 18 MHz, and high-frequency current applied: 175 mA.

[Measurement Method for Average Particle Size of Titanium Oxide]

Measurement of primary particle sizes of titanium oxide-based additives (B-1) to (B-8) used in Examples and Comparative Examples was carried out after preparing samples by the following methods.

In aromatic polycarbonate resin (A), 5 parts by weight of titanium oxide-based additive (B) used in Examples and Comparative Examples was added, and the mixture was kneaded in the same way as in Examples and Comparative Examples to prepare pellets. From these pellets, ultra-thin section having a thickness of about 200 nm for STEM observation was cut out using ultra-micro tome, and primary particle image of titanium oxide was obtained by STEM observation (magnification: 50,000 powers) using scanning type electron microscope S-4800 manufactured by Hitachi High-Technologies Corp. An average value of major axis and minor axis of primary particle was defined as primary particle size, and an average value (a value with 0.05 μm increments in between) of 30 primary particles was used for a value of primary particle size.

Evaluation Method for Physical Properties of Molded Articles (1) Combustibility

For each resin composition obtained in Examples and Comparative Examples, injection molding was carried out using injection molding machine J 50 manufactured by Japan Steel Works, Ltd. under the following conditions of set temperature: 280° C. and metal mold temperature: 80° C., to obtain a molded article having length: 127 mm, width: 12.7 mm, and thickness: 1.0 mm as a test piece. Using the obtained test piece, vertical combustion test was carried out according to UL 94, and the combustibility results were classified to V-0, V-1 and V-2 in descending order of superiority, and the sample below the standard was classified as NG (2) Flow Value As an evaluation of fluidity and thermal stability of the resin compositions, flow value (Q value) of the pellet was evaluated by the method described in JIS K7210, Appendix C. Measurement was carried out using flow tester CFD 500D manufactured by Shimadzu Corp. and a die having hole diameter: 1.0 mmϕ and length: 10 mm under the following conditions of test temperature: 280° C., 300° C. and 320° C., test force: 160 kg/cm², preheating time: 420 sec., and amount of discharged melt resin (×0.01 cc/sec) was measured.

(3) Impact Resistance

As an evaluation of impact resistance, Charpy impact strength was measured according to ISO 179-2, using a test piece with a notch having a thickness of 3 mm. The test piece was molded by injection molding using injection molding machine SG 75 manufactured by Sumitomo Heavy Industries, Ltd. under the following conditions of set temperature: 280° C. and 300° C., and metal mold temperature: 80° C.

(4) Appearance

For each resin composition obtained in Examples and Comparative Examples, a two-tier plate having thicknesses of 1 mm and 3 mm was molded using injection molding machine J 50 manufactured by Japan Steel Works, Ltd. under the following conditions of cylinder temperature: 280° C. and metal mold temperature: 80° C., and appearance of the molded article was evaluated by visual observation.

A plate having good appearance without silver streak or resin scorch was judged as "o", and a plate in which inferior appearance severely occurred was judged as "×".

(5) Reflectance

Reflectance was measured in the part of 3 mm thick of the plate used for appearance evaluation. Measurement was carried out using spectral-colorimeter CM 3600d manufactured by Konica Minolta Holdings, Inc., under the conditions of D65/10 degree eyesight and by SCI usual measurement mode, and a value of reflectance at wavelength 440 nm was used.

[Materials Used]

Raw materials used in Examples 1 to 6 and Comparative Examples 1 to 12 were as follows.

(A) Aromatic Polycarbonate Resin

Poly-4,4-isopropylidenediphenylcarbonate

"Iupilon (registered trademark) H-3000" produced by Mitsubishi Engineering-Plastics Corp., viscosity average molecular weight: 18,000, Flow value (Q value): 17 (hereinafter, sometimes also referred to as "PC").

(B) Titanium oxide-based additive

The following titanium oxide-based additives (B-1) to (B-8) which had been surface-treated with alumina and organosiloxane were used.

(B-1): "Kronos (trade name) 2233" produced by Kronos Titan GmbH.;
(B-2): "Tipure (trade name) PCX-01" produced by Du Pont;
(B-3): "PC-5" produced by Resino Color Industry Co., Ltd.;
(B-4): "Kronos (trade name) 2230" produced by Kronos Worldwide, Inc.;
(B-5): "Tipaque (trade name) PC-3" produced by Ishihara Sangyo Kaisha, Ltd.;
(B-6): "Tipaque (trade name) PF-740" produced by Ishihara Sangyo Kaisha, Ltd.;
(B-7): "TiONA (trade name) 188" produced by Millennium Chemical Inc.;
(B-8): "RCL-69" produced by Millennium Chemical Inc.

Results of component analysis for the titanium oxides used in Examples and Comparative Examples are shown in Table 1.

TABLE 1

| | | | Titanium oxide-based additive | | | | | | | |
|---|---|---|---|---|---|---|---|---|---|---|
| | | Symbol | B-1 | B-2 | B-3 | B-4 | B-5 | B-6 | B-7 | B-8 |
| Particle size (μm) | | d | 0.20 | 0.25 | 0.20 | 0.25 | 0.20 | 0.25 | 0.20 | 0.20 |
| Composition ratio (%) | Ti | | 56.94 | 54.84 | 57.48 | 57.78 | 55.44 | 58.56 | 58.68 | 58.26 |
| | Al | a | 0.46 | 0.74 | 0.38 | 0.45 | 0.70 | 0.33 | 0.24 | 0.42 |
| | Si, O, other components | | 42.60 | 44.42 | 42.14 | 41.77 | 43.86 | 41.11 | 41.08 | 41.32 |
| | C | c | 0.49 | 0.43 | 0.58 | 0.24 | 0.35 | 0.09 | 0.29 | 0.11 |
| (1) | Value of $a/d^2$ | | 11.4 | 11.9 | 9.4 | 7.2 | 17.5 | 5.2 | 6.0 | 10.5 |
| (2) | Value of $c/d^2$ | | 12.25 | 6.88 | 14.5 | 3.84 | 8.75 | 1.44 | 7.25 | 2.75 |

(C) Metal Salt of Aromatic Sulfonic Acid (C-1) Sodium toluenesulfonate: "Chemguard (trade name) NATS" produced by Chembridge International;
(C-2) Potassium toluenesulfonate: "Chemguard (trade name) PABS" produced by Chembridge International.

(D) Polytetrafluoroethylene (PTFE)

(D-1) "Polyflon (trade name) F-201L" produced by Daikin Industries, Ltd.

(E) Thermal Stabilizer (E-1) Tris(2,4-di-t-butylphenyl)phosphite: Trade name "AS 2112" produced by ADEKA Corp.;
(E-2) Bis(2,6-di-t-butyl-4-methylphenyl)pentaerythritol diphosphite: Trade name "PEP 36" produced by ADEKA Corp.

(F) Mold Release Agent

Pentaerythritol distearate: "Unister (trade name) H476D" produced by NOF Corp.

Examples 1 to 6 and Comparative Examples 1 to 12

Each of the above-described components was blended in the ratios (parts by weight) shown in Tables 2 to 4, mixed by a tumbler, and then fed into a hopper of a twin-screw extruder (12 blocks, TEX30XCT) manufactured by Japan Steel Works, Ltd. Each resin component was melt-kneaded under the conditions of cylinder temperature: 270° C., 200 rpm, and extrusion speed: 25 kg/hour. The melt resin composition extruded in strand form was quenched in a water bath, pelletized by a pelletizer, to obtain the polycarbonate resin composition pellets described in Tables 2 to 4. The resultant resin compositions were evaluated for various items according to the above-described methods.

Results are shown in Tables 2 to 4.

TABLE 2

|  |  |  | Example | | | | | |
| --- | --- | --- | --- | --- | --- | --- | --- | --- |
|  | Symbol |  | 1 | 2 | 3 | 4 | 5 | 6 |
| Component |  |  |  |  |  |  |  |  |
| PC | A | Parts by | 100 | 100 | 100 | 100 | 100 | 100 |
| Titanium oxide | B-1 | weight | 12 | 12 | 12 |  |  | 30 |
|  | B-2 |  |  |  |  | 12 |  |  |
|  | B-3 |  |  |  |  |  | 12 |  |
|  | B-4 |  |  |  |  |  |  |  |
|  | B-5 |  |  |  |  |  |  |  |
|  | B-6 |  |  |  |  |  |  |  |
|  | B-7 |  |  |  |  |  |  |  |
|  | B-8 |  |  |  |  |  |  |  |
| Metal salt of | C-1 |  | 0.2 | 0.2 |  | 0.2 | 0.2 | 0.2 |
| aromatic | C-2 |  |  |  | 0.2 |  |  |  |
| sulfonic acid |  |  |  |  |  |  |  |  |
| PTFE | D-1 |  | 0.4 | 0.4 | 0.4 | 0.4 | 0.4 | 0.4 |
| Thermal | E-1 |  |  | 0.04 |  |  |  |  |
| stabilizer | E-2 |  | 0.03 |  | 0.03 | 0.03 | 0.03 | 0.03 |
| Mold release | F |  | 0.15 | 0.15 | 0.15 | 0.15 | 0.15 | 0.15 |
| agent |  |  |  |  |  |  |  |  |
| c × [B] |  |  | 5.2 | 5.2 | 5.2 | 4.6 | 6.2 | 11.2 |
| Evaluation results |  |  |  |  |  |  |  |  |
| Combustibility, 1 mm thickness | UL 94 |  | V-0 | V-0 | V-0 | V-0 | V-0 | V-0 |
| Flow value | 280° C. | ×0.01 | 18 | 18 | 18 | 17 | 17 | 12 |
|  | 300° C. | ml/sec | 38 | 38 | 37 | 36 | 36 | 26 |
|  | 320° C. |  | 75 | 75 | 80 | 76 | 74 | 58 |
| Charpy impact | 280° C. | kJ/m$^2$ | 42 | 42 | 40 | 40 | 37 | 35 |
| strength | 300° C. |  | 37 | 37 | 35 | 36 | 33 | 31 |
| Appearance |  |  | ○ | ○ | ○ | ○ | ○ | ○ |
| Reflectance |  | % | 94.8 | 94.8 | 94.8 | 95.2 | 94.2 | 96.0 |

TABLE 3

|  |  |  | Comparative Example | | | | | |
| --- | --- | --- | --- | --- | --- | --- | --- | --- |
|  | Symbol |  | 1 | 2 | 3 | 4 | 5 | 6 |
| Component |  |  |  |  |  |  |  |  |
| PC | A | Parts by | 100 | 100 | 100 | 100 | 100 | 100 |
| Titanium oxide | B-1 | weight |  | 2 | 12 | 12 | 12 | 12 |
|  | B-2 |  |  |  |  |  |  |  |
|  | B-3 |  |  |  |  |  |  |  |
|  | B-4 |  |  |  |  |  |  |  |
|  | B-5 |  |  |  |  |  |  |  |
|  | B-6 |  |  |  |  |  |  |  |
|  | B-7 |  |  |  |  |  |  |  |
|  | B-8 |  |  |  |  |  |  |  |
| Metal salt of | C-1 |  |  | 0.2 | 0.2 | 0.004 | 1.1 | 0.2 | 0.2 |
| aromatic | C-2 |  |  |  |  |  |  |  |
| sulfonic acid |  |  |  |  |  |  |  |  |
| PTFE | D-1 |  | 0.4 | 0.4 | 0.4 | 0.4 | 0.04 | 1 |
| Thermal | E-1 |  |  |  |  |  |  |  |
| stabilizer | E-2 |  | 0.03 | 0.03 | 0.03 | 0.03 | 0.03 | 0.03 |
| Mold release | F |  | 0.15 | 0.15 | 0.15 | 0.15 | 0.15 | 0.15 |
| agent |  |  |  |  |  |  |  |  |
| c × [B] |  |  | — | 1.0 | 5.2 | 5.2 | 5.2 | 5.2 |
| Evaluation results |  |  |  |  |  |  |  |  |
| Combustibility, 1 mm thickness | UL 94 |  | NG | V-0 | NG | V-0 | NG | V-0 |
| Flow value | 280° C. | ×0.01 | 17 | 17 | 17 | 18 | 19 | 15 |
|  | 300° C. | ml/sec | 36 | 35 | 37 | 38 | 40 | 31 |
|  | 320° C. |  | 74 | 71 | 74 | 80 | 80 | 70 |

TABLE 3-continued

|  | Symbol |  | Comparative Example | | | | | |
|---|---|---|---|---|---|---|---|---|
|  |  |  | 1 | 2 | 3 | 4 | 5 | 6 |
| Charpy impact strength | 280° C. | kJ/m² | 42 | 40 | 43 | 30 | 30 | 18 |
|  | 300° C. |  | 38 | 38 | 37 | 23 | 27 | — |
| Appearance |  |  | ○ | ○ | ○ | X | ○ | X |
| Reflectance |  | % | 40.0 | 91.5 | 94.8 | 94.8 | 94.7 | 94.6 |

TABLE 4

|  | Symbol |  | Comparative Example | | | | | |
|---|---|---|---|---|---|---|---|---|
|  |  |  | 7 | 8 | 9 | 10 | 11 | 12 |
| Component |  |  |  |  |  |  |  |  |
| PC | A | Parts by weight | 100 | 100 | 100 | 100 | 100 | 100 |
| Titanium oxide | B-1 |  |  |  |  |  |  |  |
|  | B-2 |  |  |  |  |  |  |  |
|  | B-3 |  |  |  |  |  |  |  |
|  | B-4 |  | 12 |  |  |  |  |  |
|  | B-5 |  |  | 12 |  |  |  |  |
|  | B-6 |  |  |  | 12 | 12 |  |  |
|  | B-7 |  |  |  |  |  | 12 |  |
|  | B-8 |  |  |  |  |  |  | 12 |
| Metal salt of aromatic sulfonic acid | C-1 |  | 0.2 | 0.2 |  | 0.2 | 0.2 | 0.2 |
|  | C-2 |  |  |  |  |  |  |  |
| PTFE | D-1 |  | 0.4 | 0.4 | 0.4 | 0.4 | 0.4 | 0.4 |
| Thermal stabilizer | E-1 |  |  |  |  |  |  |  |
|  | E-2 |  | 0.03 | 0.03 | 0.03 | 0.03 | 0.03 | 0.03 |
| Mold release agent | F |  | 0.15 | 0.15 | 0.15 | 0.15 | 0.15 | 0.15 |
| c × [B] |  |  | 2.6 | 3.7 | 1.0 | 1.0 | 3.1 | 1.2 |
| Evaluation results |  |  |  |  |  |  |  |  |
| Combustibility, 1 mm thickness | UL 94 |  | V-0 | NG | NG | NG | NG | NG |
| Flow value | 280° C. | ×0.01 | 17 | 24 | 17 | 26 | 24 | 27 |
|  | 300° C. | ml/sec | 35 | 65 | 35 | 72 | 71 | 85 |
|  | 320° C. |  | 76 | 148 | 72 | 158 | 150 | 172 |
| Charpy impact strength | 280° C. | kJ/m² | 39 | 16 | 42 | 18 | 17 | 15 |
|  | 300° C. |  | 19 | — | 37 | — | — | — |
| Appearance |  |  | ○ | X | ○ | X | X | X |
| Reflectance |  | % | 94.8 | 94.8 | 94.8 | 93.8 | 93.6 | 93.2 |

From the results shown in Table 2, the following things can be found.

The resin compositions of Examples 1 to 6 according to the present invention have superior thermal stability, combustibility, appearance, strength, and reflective property. Example 3 in which a different kind of metal of sulfonic acid was used exhibits same effects as in Examples 1 and 2. Examples 4 and 5 in which kind of titanium oxide-based additive was changed from the one used in Examples 1 to 3 exhibit same effects as the compositions of Examples 1 to 3. In this regard, however, Example 4 is slightly inferior in impact resistance at high temperature. Example 6 in which kind of titanium oxide-based additive was changed has the same thermal stability as Example 1, and has further superior reflective property.

On the other hand, from the results in Table 3 and Table 4, the following things can be found. Comparative Examples 1 and 2 are inferior in reflectance due to insufficient amount of the titanium oxide-based additive. Comparative Example 3 cannot exhibit sufficient combustibility due to insufficient amount of metal salt of aromatic sulfonic acid. Comparative Example 4 exhibits superior combustibility but inferior appearance due to excess amount of metal salt of aromatic sulfonic acid. Comparative Example 5 exhibits insufficient combustibility due to insufficient amount of polytetrafluoroethylene, contrary Comparative Example 6 exhibits inferior appearance and impact resistance due to excess amount of polytetrafluoroethylene. Comparative Example 7 exhibits sufficient combustibility, but inferior impact resistance in high temperature (300° C.) molding. Comparative Examples 8 and 10 to 12 are inferior in thermal stability, impact resistance, appearance and combustibility, because amount of the surface treatment agent for titanium oxide-based additive using the metal salt of aromatic sulfonic acid was not appropriate. Comparative Example 8 in which the metal salt of aromatic sulfonic acid was absent showed that superior thermal stability could be obtained even with the titanium oxide-based additive other than the one of present invention, but flame retardancy was inferior.

Examples 7 to 13 and Comparative Examples 13 to 14

Materials Used

Raw materials used in Examples 7 to 13 and Comparative Examples 13 to 14 are as follows.

<Aromatic Polycarbonate Resin (A)>

The same "Iupiron (registered trademark) H-3000" as used in the previous Examples 1 to 6 and Comparative Examples 1 to 12 was used.

<Titanium Oxide-Based Additive (B)>

Titanium oxide-based additive (B-1): Trade name "Kronos 2233" produced by Kronos Titan GmbH. used in the previous Examples (particle size: 0.20 μm, Al content a: 0.46 wt %, carbon content c: 0.49 wt %, $a/d^2=11.4$, $c/d^2=12.25$) was used.

<Metal Salt of Aromatic Sulfonic Acid Compound (C)>

Metal Salt of Aromatic Sulfonic Acid Compounds (C-3) to (C-5)

Various kinds of metal salt of aromatic sulfonic acids having different pH were prepared as described below.

Para-toluenesulfonic acid was dissolved in ion-exchanged water to prepare a 20% aqueous solution. After that, sodium para-toluenesulfonate aqueous solutions having different pH were prepared by adding sodium hydroxide aqueous solution while an addition amount was adjusted. After that, the aqueous solutions were subjected to heat treatment to vaporize water to obtain sodium para-toluenesulfonates (C-3) to (C-5) having different pH.

Each of sodium para-toluenesulfonates (C-3) to (C-5) prepared was dissolved in ion-exchanged water again to prepare 10% aqueous solutions, and pH of each solution was measured using a pH meter. To make sure completion of the neutralization reaction, it was confirmed that a 10% aqueous solution and a 20% aqueous solution of sodium para-toluenesulfonate showed almost same pH values. Each pH value of sodium para-toluenesulfonates (C-3) to (C-5) were as shown below.

(C-3): PH=7.8
(C-4): PH=6.7
(C-5): PH=8.3

Metal Salt of Aromatic Sulfonic Acid Compound:

(C-1) Sodium para-toluenesulfonate (same to the previous C-1): Trade name "Chemguard NATS" produced by Chembridge International (pH=7.6, measured by the above-described method);

(C-2) Potassium para-toluenesulfonate (same to the previous C-2): Trade name "Chemguard PABS" produced by Chembridge International (pH=7.4, measured by the above-described method).

<Polytetrafluoroethylene (D)>

(D-2) Trade name "Polyflon FA-500B" produced by Daikin Industries, Ltd.

<Thermal Stabilizer (E)>

Thermal stabilizer (E-1) and thermal stabilizer (E-2) same as those used in the previous Examples 1 to 6 and Comparative Examples 1 to 12 were used.

<Mold Release Agent (F)>

The same pentaerythritol distearate as that used in the previous Examples 1 to 6 and Comparative Examples 1 to 12 was used.

Aromatic polycarbonate resin (A), titanium oxide-based additive (B), metal salt of aromatic sulfonic acid compound (C), polytetrafluoroethylene (D), thermal stabilizer (E), and mold release agent (F) were blended in a ratios (ratio by mass) as shown in Table 5, mixed by a tumbler, and then fed into a hopper of a twin-screw extruder (12 blocks, TEX30XCT). Respective resin components were melt kneaded under the conditions of cylinder temperature: 270° C., 200 rpm and extrusion speed: 25 kg/hour to obtain pellets of each resin composition.

The resultant resin compositions were evaluated for (1) combustibility, (2) flow value, (3) appearance, and (4) reflectance, according to the same methods as in the previous Examples and Comparative Examples.

Results are shown in Table 5.

TABLE 5

| | | Example | | | | | | | Comparative Example | |
|---|---|---|---|---|---|---|---|---|---|---|
| | | 7 | 8 | 9 | 10 | 11 | 12 | 13 | 13 | 14 |
| Component (Parts by weight) | | | | | | | | | | |
| PC (A) | | 100 | 100 | 100 | 100 | 100 | 100 | 100 | 100 | 100 |
| Titanium oxide (B-1) | | 13 | 13 | 13 | 13 | 13 | 13 | 26 | 2 | 13 |
| Metal salt | C-3 | 0.3 | 0.3 | | | | | 0.3 | 0.3 | 0.004 |
| of aromatic | C-4 | | | 0.3 | | | | | | |
| sulfonic acid | C-5 | | | | 0.3 | | | | | |
| | C-1 | | | | | 0.3 | | | | |
| | C-2 | | | | | | 0.3 | | | |
| PTFE (D-2) | | 0.45 | 0.45 | 0.45 | 0.45 | 0.45 | 0.45 | 0.45 | 0.45 | 0.45 |
| Thermal | E-1 | | 0.04 | | | | | | | |
| stabilizer | E-2 | 0.03 | | 0.03 | 0.03 | 0.03 | 0.03 | 0.03 | 0.03 | 0.03 |
| Mold release agent (F) | | 0.15 | 0.15 | 0.15 | 0.15 | 0.15 | 0.15 | 0.15 | 0.15 | 0.15 |
| c × [B] | | 5.6 | 5.6 | 5.6 | 5.6 | 5.6 | 5.6 | 10 | 1 | 5.6 |
| Evaluation result | | | | | | | | | | |
| Combustibility, 1 mm thickness | | V-0 | V-0 | V-0 | V-0 | V-0 | V-0 | V-0 | NG | NG |
| Flow value | 280° C. | 16 | 16 | 17 | 17 | 16 | 17 | 13 | 17 | 17 |
| (0.01 cc/sec) | 300° C. | 32 | 32 | 34 | 35 | 32 | 33 | 27 | 36 | 36 |
| | 320° C. | 66 | 66 | 70 | 72 | 67 | 69 | 59 | 74 | 74 |
| Appearance | | ○ | ○ | ○ | ○ | ○ | ○ | ○ | ○ | ○ |
| Reflectance (%) | | 94 | 94 | 94 | 94 | 94 | 94 | 96 | 91 | 94 |

From the results of Table 5, the following things can be found.

The resin compositions of Examples 7 to 13 which satisfy the conditions of the present invention have superior combustibility, thermal stability, appearance, and reflective property. Example 12 in which metal of the metal salt of sulfonic acid was changed to different one exhibits same effects as Examples 7 and 8.

On the other hand, Comparative Example 13 is inferior in reflectance due to insufficient addition amount of the titanium oxide-based additive, and Comparative Example 14 cannot exhibit sufficient combustibility due to insufficient amount of the metal salt of aromatic sulfonic acid.

Examples 14 to 15 and Comparative Example 15

Materials Used

Raw materials used in Examples 14 to 15 and Comparative Example 15 are as follows.
<Aromatic Polycarbonate Resin (A)>
The same polycarbonate resin as used in the previous Examples and Comparative Examples was used.
<Titanium Oxide-Based Additive (B)>
Titanium oxide-based additive (B-1): Trade name "Kronos 2233" produced by Kronos Titan GmbH. previously used (particle size d: 0.20 μm, Al content "a": 0.46 wt %, carbon content: 0.49 wt %, $a/d^2=11.4$, $c/d^2=12.25$) was used.
<Compound of Metal Salt of Aromatic Sulfonic Acid (C)>
Sodium para-toluenesulfonate (NATS (C-1)) used in the previous Examples was used.
<Polytetrafluoroethylene (D)>
(D-1) "Polyflon F-201L" produced by Daikin Industries, Ltd.
<Thermal Stabilizer (E) and Mold Release Agent (F)>
Thermal stabilizer (E-1), thermal stabilizer (E-2), and mold release agent (F) which were same as those used in the previous Examples 1 to 6 and Comparative Examples 1 to 12 were used.

The above-described respective components were blended in the ratios (parts by weight) shown in Tables 6, mixed by a tumbler, and then fed into a hopper of twin-screw extruder (12 blocks, TEX30XCT) manufactured by Japan Steel Works, Ltd. Each of the resin components was melt-kneaded under the conditions of cylinder temperature: 270° C., 200 rpm and extrusion speed: 25 kg/hour. The melt resin composition extruded in strand form was quenched in a water tank, pelletized by a pelletizer, to obtain pellets of the polycarbonate resin compositions.

For the resultant resin compositions, combustibility and reflectance were evaluated in the same manner as in the previous Examples and Comparative Examples.

Impact resistance was also evaluated in the same way except that set temperature was 280° C. only.

Evaluation of appearance was carried out as follows.

For the respective resultant resin compositions, a box-shaped molded article having a thickness of 2 mm (bottom face: 150 mm×150 mm, side face: 20 mm×150 mm, pin gate diameter: 1 mmφ) was molded using injection molding machine EC 160N-II-4A manufactured by Toshiba Machine Co., Ltd. under the conditions of cylinder temperature: 280° C. and metal mold temperature: 80° C. Appearance of the molded articles was evaluated by visual examination.

A sample having superior appearance without silver streak or resin scorch was judged as "o", and a sample in which inferior appearance severely occurred was judged as "×".

Evaluation results are shown in Table 6.

TABLE 6

| | Code | Example 14 | Example 15 | Comparative Example 15 |
|---|---|---|---|---|
| Component (Parts by weight) | | | | |
| PC | A | 100 | 100 | 100 |
| Titanium oxide | B-1 | 6 | 22 | 2.5 |
| Content of component B [B] (wt %) | | 5.6 | 17.9 | 2.4 |
| c × [B] | | 2.8 | 8.8 | 1.2 |
| Metal salt of aromatic sulfonic acid | C-1 | 0.2 | 0.2 | 0.2 |
| PTFE | D-1 | 0.4 | 0.4 | 0.4 |
| Thermal stabilizer | E-1 | | | 0.04 |
| | E-2 | 0.03 | 0.03 | |
| Mold release agent | F | 0.15 | 0.15 | 0.15 |
| Evaluation result | | | | |
| Combustibility, 1 mm thickness | | V-0 | V-0 | V-1 |
| Charpy impact strength (kJ/m$^2$) | | 42 | 42 | 45 |
| Appearance | | ◯ | ◯ | ◯ |
| Reflectance (%) | | 93.5 | 95.3 | 89 |

From the results of Table 6, the resin compositions of Examples 14 to 15 according to the present invention have superior appearance, combustibility, strength, reflective property. On the other hand, Comparative Example 15 cannot exhibit sufficient reflectance and is inferior in combustibility due to insufficient addition amount of the titanium oxide-based additive.

Examples 16 to 37 and Comparative Examples 16 to 18

Materials Used

Raw materials used in Examples 16 to 37 and Comparative Examples 16 to 18 are as follows.
[Aromatic Polycarbonate Resin (A)]
(A1) Poly-4,4-isopropylidenediphenylcarbonate: Trade name "Iupilon (registered trademark) S-3000F" produced by Mitsubishi Engineering-Plastics Corp., polycarbonate resin in granular form, viscosity average molecular weight: 21,000, specific surface area: 1.24 mm$^2$/g, ratio of particle size of 180 to 1700 μm: 83 wt %;
(A2) Poly-4,4-isopropylidenediphenylcarbonate: Trade name "Iupilon (registered trademark) S-3000" produced by Mitsubishi Engineering-Plastics Corp., polycarbonate resin in pellet form, viscosity average molecular weight: 21,000, specific surface area: 0.003 mm$^2$/g, ratio of particle size of 180 to 1700 μm: 1 wt % or less (substantially 0 wt %).
[Titanium Oxide-Based Additive (B)]
Titanium oxide-based additive (B-1): Trade name "Kronos 2233" produced by Kronos Titan GmbH. previously used (particle size d: 0.20 μm, Al content "a": 0.46 wt %, carbon content: 0.49 wt %, $a/d^2=11.4$, $c/d^2=12.25$) was used.
[Metal Salt of Aromatic Sulfonic Acid (C)]
(C-1) Metal salt-based flame retardant-1 used in the previous Examples and Comparative Examples Sodium para-toluenesulfonate;
(C-2) Metal salt-based flame retardant-2 used in the previous Examples and Comparative Examples Potassium para-toluenesulfonate.
[Polytetrafluoroethylene (D)]
PTFE-1 and PTFE-2, which were obtained by maintain the following polytetrafluoroethylene having fibril-forming ability in either the following condition (1) or (2), were used.

(D-3) Trade name "Teflon (registered trademark) 6J" produced by DuPont-Mitsui Fluorochemicals Co., Ltd. (average particle size: 470 μm, bulk density: 0.47 g/ml).

Condition (1): Maintained at a temperature of 19° C. or lower (PTFE-1) (crystal structure is 13/6 helical structure);

Condition (2): Maintained at a temperature over 19° C. (PTFE-2) (crystal structure is 15/7 helical structure).

[Polycarbonate-Polytetrafluoroethylene Masterbatch (E)] (Hereinafter, Referred to as PC-PTFE Masterbatch)

(E1) PC-PTFE masterbatch-1: a masterbatch blended under any condition of the following (a) to (d) was used;

Condition (a): The above-described polycarbonate resin in a granular form (A1) maintained at a temperature over 19° C. (60 wt %) and polytetrafluoroethylene maintained at a temperature of 19° C. or lower (PTFE-1) (40 wt %) were blended by a tumbler mixer for 5 minutes;

Condition (b): the above-described polycarbonate resin in a granular form (A1) maintained at a temperature of 19° C. or lower (60 wt %) and polytetrafluoroethylene maintained at a temperature of 19° C. or lower (PTFE-1) (40 wt %) were blended by a tumbler mixer under the atmosphere of 19° C. or lower for 5 minutes;

Condition (c): the masterbatch obtained by blending under the condition of the above (b) was maintained under the atmosphere of 19° C. or lower;

Condition (d): the above-described polycarbonate resin in a granular form (A1) maintained at a temperature over 19° C. (60 wt %) and polytetrafluoroethylene maintained at a temperature over 19° C. (PTFE-2) (40 wt %) were blended by a tumbler mixer for 5 minutes.

(E2) PC-PTFE masterbatch-2: a masterbatch blended under the following condition (e) was used;

Condition (e): the above-described polycarbonate resin in a granular form (A1) maintained at a temperature over 19° C. (80 wt %) and polytetrafluoroethylene maintained at a temperature of 19° C. or lower (PTFE-1) (20 wt %) were blended by a tumbler mixer for 5 minutes.

[Polycarbonate-TiO$_2$ Masterbatch (F)]

(F1) PC-TiO$_2$ masterbatch-1: polycarbonate resin in a granular form (A1) (70 wt %) and titanium oxide-based additive (B) (30 wt %) were blended by a Henschel mixer for 1 minute;

(F2) PC-TiO$_2$ masterbatch-2: polycarbonate resin in a granular form (A1) (80 wt %) and titanium oxide-based additive (B) (20 wt %) were blended by a Henschel mixer for 1 minute.

[Polycarbonate-Metal Salt Masterbatch (G)]

(G1) PC-metal salt masterbatch-1: polycarbonate resin in a granular form (A1) (99 wt %) and metal salt type flame retardant (C2) (1 wt %) were blended by a Henschel mixer for 1 minute;

(G2): PC-metal salt masterbatch-2: polycarbonate resin in a granular form (A1) (99 wt %) and metal salt type flame retardant (C3) (1 wt %) were blended by a Henschel mixer for 1 minute.

[Phosphorus-Based Stabilizer (H)]

Tris(2,4-di-t-butylphenyl)phosphite: Trade name "Adekastab 2112" produced by ADEKA Corp.

(Preparation of Pellet and Test Piece)

Using the materials shown in Tables 7 to 9 as components (A) to (H), respective components were blended in the ratios described in Tables 7 to 9, mixed by a tumbler for 20 minutes, fed to twin-screw extruder having one vent (TEX30H SST) manufactured by Japan Steel Works, Ltd., and then kneaded under the conditions of screw revolution number: 200 rpm, extrusion speed: 15 kg/hour, and barrel temperature: 290° C. The melted resin composition extruded in a strand form was quenched in a water bath, pelletized using a pelletizer, to obtain pellets of the polycarbonate resin composition.

Subsequently, the pellets obtained by the above-described production method were, after drying at 120° C. for 5 hours, injection-molded using injection machine, type M150AII-SJ manufactured by Meiki Co., Ltd. under the conditions of cylinder temperature: 280° C. and metal mold temperature: 80° C., to mold a flat plate test piece having length: 150 mm, width: 100 mm and thickness: 3 mm.

Similarly, the pellets obtained by the above-described production method were, after drying at 120° C. for 5 hours, injection-molded using injection machine, type J50-EP manufactured by The Japan Steel Works, Ltd. under the conditions of cylinder temperature: 280° C. and metal mold temperature: 80° C., to mold a test piece for UL test having length: 125 mm, width: 13 mm and thickness: 2 mm.

[Appearance of Molded Article]

Appearance of the molded articles was evaluated by counting number of silver streaks on the surface of five flat plate-like test pieces obtained by the above-described method, calculating an average value per one piece, and then classifying to the following 5 stages of A to E.

A: number of silver streaks is 0 to 2;
B: number of silver streaks is 3 to 5;
C: number of silver streaks is 6 to 8;
D: number of silver streaks is 9 to 11;
E: number of silver streaks is 12 or more.

Results of respective evaluations are shown in Tables 7 to 9.

TABLE 7

| Code | Component | | Example | | | | | | | |
|------|-----------|--|---------|--|--|--|--|--|--|--|
| | | | 16 | 17 | 18 | 19 | 20 | 21 | 22 | 23 |
| A1 | Polycarbonate (granular form) | | 87.35 | 59.35 | 86.75 | | 86.75 | 86.75 | 58.75 | |
| A2 | Polycarbonate (pellet form) | | | | | 86.75 | | | | 58.75 |
| B | Titanium oxide-based additive | | 12 | | 12 | 12 | 12 | 12 | | |
| C1 | Metal salt-based flame retardant-1 | | 0.2 | 0.2 | 0.2 | 0.2 | 0.2 | 0.2 | 0.2 | 0.2 |
| C2 | Metal salt-based flame retardant-2 | | | | | | | | | |
| D | PTFE (D-3) | Condition (1) | 0.4 | 0.4 | | | | | | |
| | | Condition (2) | | | | | | | | |
| E | PC-PTFE masterbatch-1 | Condition (a) | | | 1 | 1 | | | 1 | 1 |
| | | Condition (b) | | | | | 1 | | | |
| | | Condition (c) | | | | | | 1 | | |
| | | Condition (d) | | | | | | | | |
| | PC-PTFE masterbatch-2 | Condition (e) | | | | | | | | |
| F | PC-TiO$_2$ masterbatch-1 | | | 40 | | | | | 40 | 40 |
| | PC-TiO$_2$ masterbatch-2 | | | | | | | | | |

TABLE 7-continued

| | | Example | | | | | | | |
|---|---|---|---|---|---|---|---|---|---|
| Code | Component | 16 | 17 | 18 | 19 | 20 | 21 | 22 | 23 |
| G | PC-Metal salt masterbatch-1 | | | | | | | | |
| | PC-Metal salt masterbatch-2 | | | | | | | | |
| H | Phosphorus-based stabilizer | 0.05 | 0.05 | 0.05 | 0.05 | 0.05 | 0.05 | 0.05 | 0.05 |
| Combustibility (2 mm) | | V-0 | V-0 | V-0 | V-0 | V-0 | V-0 | V-0 | V-0 |
| Extrusion stability | | Superior productivity without strand cut | | Very superior productivity without strand cut | | | | | |
| Appearance of molded article | | D | B | B | B | B | B | A | A |

TABLE 8

| | | Example | | | | | | | |
|---|---|---|---|---|---|---|---|---|---|
| Code | Component | 24 | 25 | 26 | 27 | 28 | 29 | 30 | 31 |
| A1 | Polycarbonate (granular form) | 58.75 | 58.75 | 38.75 | 38.95 | | 38.95 | 38.95 | 18.95 |
| A2 | Polycarbonate (pellet form) | | | | | 38.95 | | | |
| B | Titanium oxide-based additive | | | | | | | | |
| C1 | Metal salt-based flame retardant-1 | 0.2 | 0.2 | 0.2 | | | | | |
| C2 | Metal salt-based flame retardant-2 | | | | | | | | |
| D | PTFE (D-3) Condition (1) | | | | | | | | |
| | Condition (2) | | | | | | | | |
| E | PC-PTFE Condition (a) | | | 1 | 1 | 1 | | | 1 |
| | masterbatch-1 Condition (b) | 1 | | | | | 1 | | |
| | Condition (c) | | 1 | | | | | 1 | |
| | Condition (d) | | | | | | | | |
| | PC-PTFE Condition (e) | | | | | | | | |
| | masterbatch-2 | | | | | | | | |
| F | PC-TiO₂ masterbatch-1 | 40 | 40 | | 40 | 40 | 40 | 40 | |
| | PC-TiO₂ masterbatch-2 | | | 60 | | | | | 60 |
| G | PC-Metal salt masterbatch-1 | | | | 20 | 20 | 20 | 20 | 20 |
| | PC-Metal salt masterbatch-2 | | | | | | | | |
| H | Phosphorus-based stabilizer | 0.05 | 0.05 | 0.05 | 0.05 | 0.05 | 0.05 | 0.05 | 0.05 |
| Combustibility (2 mm) | | V-0 | V-0 | V-0 | V-0 | V-0 | V-0 | V-0 | V-0 |
| Extrusion stability | | Very superior productivity without strand cut | | | | | | | |
| Appearance of molded article | | A | A | A | A | A | A | A | A |

TABLE 9

| | | Example | | | | | | Comparative Example | | |
|---|---|---|---|---|---|---|---|---|---|---|
| Code | Component | 32 | 33 | 34 | 35 | 36 | 37 | 16 | 17 | 18 |
| A1 | Polycarbonate (granular form) | 85.75 | 65.95 | 57.75 | 37.95 | 86.75 | 58.75 | 87.35 | 87.35 | 86.75 |
| A2 | Polycarbonate (pellet form) | | | | | | | | | |
| B | Titanium oxide-based additive | 12 | 12 | | | 12 | | 12 | 12 | 12 |
| C1 | Metal salt-based flame retardant-1 | 0.2 | | 0.2 | | | | 0.2 | | 0.2 |
| C2 | Metal salt-based flame retardant-2 | | | | | 0.2 | 0.2 | | 0.2 | |
| D | PTFE (D-3) Condition (1) | | | | | | | | | |
| | Condition (2) | | | | | | | 0.4 | 0.4 | |
| E | PC-PTFE Condition (a) | | | | | 1 | 1 | | | |
| | masterbatch-1 Condition (b) | | | | | | | | | |
| | Condition (c) | | | | | | | | | |
| | Condition (d) | | | | | | | | | 1 |
| | PC-PTFE Condition (e) | 2 | 2 | 2 | 2 | | | | | |
| | masterbatch-2 | | | | | | | | | |
| F | PC-TiO₂ masterbatch-1 | | | 40 | 40 | | 40 | | | |
| | PC-TiO₂ masterbatch-2 | | | | | | | | | |
| G | PC-Metal salt masterbatch-1 | | 20 | | 20 | | | | | |
| | PC-Metal salt masterbatch-2 | | | | | | | | | |
| H | Phosphorus-based stabilizer | 0.05 | 0.05 | 0.05 | 0.05 | 0.05 | 0.05 | 0.05 | 0.05 | 0.05 |
| Combustibility (2 mm) | | V-0 | V-0 | V-0 | V-0 | V-0 | V-0 | V-0 | V-0 | V-0 |
| Extrusion stability | | Very superior productivity without strand cut | | | | | | Inferior productivity with many strand cuts | | Superior productivity |
| Appearance of molded article | | B | B | A | A | B | A | E | E | D |

It can be found that the resin compositions described in Examples 16 to 37 are superior in producibility in the melt-kneading in comparison with Comparative Examples 16 to 18, and also superior in appearance of molded article. In addition, the resin composition using the polycarbonate resin-$TiO_2$ masterbatch was superior in appearance of molded article having less number of silver streaks compared with the case where the masterbatch was not used.

Combustibility (thickness: 2 mm) of the resin compositions of Examples 16 to 37 and Comparative Examples 16 to 18 were V-0 in every case, among them, Examples 27 to 31, 33, and 35 in which the polycarbonate resin-metal salt masterbatch was used showed less variation in combustibility. It can be found that the effect of improved dispersion of the flame retardant is exhibited.

On the other hand, although the resin composition of Comparative Example 18 exhibited V-0 with 2 mm thickness in combustibility, it showed greater variation of combustibility compared with Examples, because the resin composition using the polycarbonate resin-polytetrafluoroethylene masterbatch in which polytetrafluoroethylene maintained at a temperature over 19° C. was used. Production stability was more superior than Comparative Examples 16 to 17.

INDUSTRIAL APPLICABILITY

As described above, the aromatic polycarbonate resin composition of the present invention is superior in thermal stability, flame retardancy, appearance, impact resistance, and light beam reflectance, and hence can be a suitable material to light reflective members for liquid crystal display member and the like.

In addition, by using a titanium oxide-based flame retardant surface-treated with alumina and organosiloxane and polytetrafluoroethylene as a flame retarding auxiliaries in which crystal structure thereof has a 13/6 helical structure in the blending process, producibility in production can be stabilized, occurrence of surface defects such as silver streak caused by agglomerated polytetrafluoroethylene is not observed in molded articles, and a polycarbonate resin composition which has superior appearance and impact resistance, as well as high reflectance and flame retardancy can be produced.

Accordingly, the polycarbonate resin composition of the present invention can be utilized in a wide ranged field including electric/electronic equipment, office automation equipment, information terminal equipment, home electric appliances, and lighting equipment. In particular, the resin composition can be used widely as light reflective members such as light beam reflection plate for backlight of liquid crystal display devices, light reflection frame or light reflection sheet, illumination devices for electric/electronic equipment, advertising light and the like, automobile devices such as instrument panel for automobile, and the like. Therefore, industrial applicability of the resin composition is very high.

The invention claimed is:

1. An aromatic polycarbonate resin composition, comprising:
   3 to 30 parts by weight of a titanium oxide-comprising additive (B) which has been surface-treated with alumina and organosiloxane;
   0.01 to 1 parts by weight of a metal salt of an aromatic sulfonic acid (C); and
   0.05 to 0.9 parts by weight of a polytetrafluoroethylene (D) based on 100 parts by weight of an aromatic polycarbonate resin (A),
   wherein
   (a) an aluminium content a (wt %) in the titanium oxide-comprising additive (B) obtained by fluorescent X-ray analysis,
   (c) a carbon content c (wt %) in the titanium oxide-comprising additive (B) obtained by a high-frequency combustion carbon analyzer, and
   (d) an average particle size d (gm) of titanium oxide, satisfy (1) and (2):

$$6.5 \leq (a/d^2) \leq 15 \quad (1)$$

$$5 \leq (c/d^2) \leq 25 \quad (2), \text{ and}$$

(e) a content [B] (wt %) of the titanium oxide-comprising additive (B) based on a total amount of 100 wt % of the aromatic polycarbonate resin composition, and the carbon content c (wt %), satisfy (3):

$$1 \leq c \times [B] \leq 9 \quad (3).$$

2. The composition of claim 1, wherein the carbon content c in the titanium oxide-comprising additive (B) is 0.2 to 2 wt %.

3. The composition of claim 1, wherein the organosiloxane is a polyorganosiloxane comprising a Si—H group.

4. The composition of claim 1, wherein an aromatic ring of the metal salt of aromatic sulfonic acid (C) has no substituent or has only an alkyl group having 1 to 4 carbon atoms as a substituent, and
   wherein the pH of the metal salt of aromatic sulfonic acid (C) in an aqueous solution is 6.0 to 8.5.

5. The composition of claim 1, wherein the metal salt of aromatic sulfonic acid (C) is sodium para-toluenesulfonate or potassium para-toluenesulfonate.

6. A molded article, obtained from the composition of claim 1.

7. The molded article of claim 6, which is a light reflective member.

* * * * *